United States Patent
Timbol

(10) Patent No.: US 6,237,135 B1
(45) Date of Patent: May 22, 2001

(54) DEVELOPMENT SYSTEM WITH VISUAL DESIGN TOOLS FOR CREATING AND MAINTAINING JAVA BEANS COMPONENTS

(75) Inventor: Michael Timbol, Scotts Valley, CA (US)

(73) Assignee: Borland Software Corporation, Scotts Valley, CA (US)

( * ) Notice: Subject to any disclaimer, the term of this patent is extended or adjusted under 35 U.S.C. 154(b) by 0 days.

(21) Appl. No.: 09/151,562

(22) Filed: Sep. 11, 1998

Related U.S. Application Data

(60) Provisional application No. 60/089,799, filed on Jun. 18, 1998.

(51) Int. Cl.[7] .................................................. G06F 9/45
(52) U.S. Cl. ....................................................... 717/1; 717/2
(58) Field of Search .................................................. 717/1, 2

(56) References Cited

U.S. PATENT DOCUMENTS

| | | | |
|---|---|---|---|
| 5,724,589 | * | 3/1998 | Wold ......................................... 717/1 |
| 5,991,534 | * | 11/1999 | Hamilton et al. ........................ 717/1 |
| 6,078,743 | * | 6/2000 | Apte et al. ................................ 717/1 |

OTHER PUBLICATIONS

Garrett–Potts–Friedel, Jr., Visual Café Programming FrontRunner, Coriolis Group Books, Chapters 1,2 & 11, May 1997.*

Johnson, A Walking Tour of JavaBeans, JavaWorld, Aug. 1997.*

Hughes, Building a bevy of beans, JavaWorld, http://www.javaworld.com/javaworld/jw–08–1997/f_jw–08–step_p.html, Aug. 1997.*

Hughes, Building a bevy of beans: Create reuseable JavaBeans components, JavaWorld, http://www.javaworld.com/javaworld/jw–09–1997/f_jw–09–step_p.html, Sep. 1997.*

Johnson, "Double Shot, Half Decaf, Skinny Latte" —Customize your Java, JavaWorld, http://www.javaworld.com/javaworld/jw–09–1997/f_jw–09–beans_p.html, Sep. 1997.*

Vanhelsuwé, JavaBeans: properties, events, and thread safety, JavaWorld, http://www.javaworld.com/javaworld/jw–09–1997/f_jw–09–raceconditions_p.html, Sep. 1997.*

Johnson, The BeanBox: Sun's JavaBeans test container, JavaWorld, http://www.javaworld.com/javaworld/jw–09–1997/f_jw–09–beanbox_p.html, Sep. 1997.*

(List continued on next page.)

Primary Examiner—Mark R. Powell
Assistant Examiner—Hoang-Vu Antony Nguyen-Ba
(74) Attorney, Agent, or Firm—John A. Smart

(57) ABSTRACT

A component-based, rapid application development (RAD) Java system providing visual designers (i.e., wizards) and methodology allowing a developer (user) to create Java Beans-compatible components rapidly and easily is described. In typical operation of the system, the user may generate a "bean" component by invoking a wizard-based interface that implements methodology for automatically generating and managing the bean. The user employs the wizard to specify information about the bean, such as the name of the bean, the package it will be in, and the class it extends from. In response to the user input, the system creates a bean with the name the user specified, places it in the user's current project, and displays the source code generated for the bean. The user may visually interact with the bean (or other existing bean) by using the visual designers to manage the bean's properties, including: adding properties to the bean, adding bound and constrained properties, modifying properties of the bean, removing properties from the bean, or even generate a custom property editor. In a similar manner, the user may proceed to use the visual designers to manage the bean's events, including: adding events, listening for events, and creating custom event sets.

38 Claims, 13 Drawing Sheets

OTHER PUBLICATIONS

Johnson, "Keep listening for upcoming events", JavaWorld, http://www.javaworld.com/javaworld/jw–09–1997/f_jw–10–beans_p.html, Oct. 1997.*

Johnson, Do it the "Nescafé" way—with freeze–dried Java-Beans, JavaWorld, http://www.javaworld.com/javaworld/jw–01–1998/f_jw–01–beans_p.html, Jan. 1998.*

Johnson, Serialization and the JavaBeans Specification, JavaWorld, http://www.javaworld.com/javaworld/jw–02–1998/f_jw–02–beans_p.html, Feb. 1998.*

Dichter, We test the top 6 Java visual IDEs, JavaWorld, http://www.javaworld.com/javaworld/jw–04–1998/f_jw–04–visual–ides_p.html, Apr. 1998.*

Johnson, Turn Java classes into JavaBeans, JavaWorld, http://www.javaworld.com/javaworld/jw–06–1998/f_jw–06–beans_p.html, Jun. 1998.*

Berg, Cliff, Java Q&A: How Do I Create a JavaBean?, Dr. Dobb's Journal, p. 102–104, 114–115, Sep. 1997.

Renshaw, David S., Making Components Portable with JavaBeans, BYTE, pp. 81–88, Feb. 1998.

* cited by examiner

DEVELOPMENT SYSTEM WITH VISUAL DESIGN TOOLS FOR CREATING AND MAINTAINING JAVA BEANS COMPONENTS

RELATED APPLICATIONS

The present application is related to and claims the benefit of priority from the following commonly-owned, co-pending U.S. provisional patent application: Ser. No. 60/089,799, filed Jun. 18, 1998, and entitled DEVELOPMENT SYSTEM WITH VISUAL DESIGN TOOLS FOR CREATING AND MAINTAINING JAVA BEANS COMPONENTS. The disclosure of the foregoing is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to a development environment for creating application programs and other software and, particularly, to a system with methods and interfaces facilitating creation of components for use in such an environment.

With the explosive growth of the Internet and the World Wide Web, an ever-increasing number of computers of disparate platforms are being connected together. As a result, there is renewed interest in distributing software in binary format which operates in this ever-increasing heterogeneous environment. In the early 1990s, a team at Sun Microsystems developed a new language, "Java," to address the issues of software distribution on the Internet. Java is a simple, object-oriented language which supports multi-thread processing and garbage collection. Although the language is based on C++, a superset of C, it is much simpler. More importantly, Java programs are "compiled" into a binary format that can be executed on many different platforms without recompilation. The language includes built-in mechanisms for verifying and executing Java "binaries" in a controlled environment, protecting the user's computer from potential viruses and security violations.

A typical Java system comprises the following set of interrelated technologies: a language specification; a compiler for the Java language that produces bytecodes for an abstract, stack-oriented machine; a virtual machine (VM) program that interprets the bytecodes at runtime; a set of class libraries; a runtime environment that includes bytecode verification, multi-threading, and garbage collection; supporting development tools, such as a bytecode disassembler; and a browser (e.g., Sun's "Hot Java" browser).

Java is designed for creating applications that will be deployed in heterogeneous networked environments. Such environments are characterized by a variety of hardware architectures. Further, applications in such environments execute atop a variety of different operating systems and interoperate with a multitude of different programming language interfaces. To accommodate such diversity, the Java compiler generates platform-neutral "bytecodes"—an architecturally neutral, intermediate format designed for deploying application code efficiently to multiple platforms.

Java bytecodes are designed to be easy to interpret on any machine. Bytecodes are essentially high-level, machine-independent instructions for a hypothetical or "virtual" machine that is implemented by the Java interpreter and runtime system. The virtual machine, which is actually a specification of an abstract machine for which a Java language compiler generates bytecode, must be available for the various hardware/software platforms on which an application is to run. The Java interpreter executes Java bytecode directly on any machine for which the interpreter and runtime system of Java have been ported. In this manner, the same Java language bytecode runs on any platform supported by Java.

Compiling Java into platform-neutral bytecodes is advantageous. Once the Java language interpreter and runtime support are available on a given hardware and operating system platform, any Java language application can be executed. The bytecodes are portable since they do not require a particular processor, architecture, or other proprietary hardware support. Further, the bytecodes are byte-order independent, so that programs can be executed on both big-endian machines (e.g., Intel architecture) and little-endian machines (e.g., Motorola architecture). Since Java bytecodes are typed, each specifies the exact type of its operands, thereby allowing verification that the bytecodes obey language constraints. All told, the interpreted bytecode approach of compiled Java language programs provides portability of programs to any system on which the Java interpreter and runtime system have been implemented.

The bytecodes are actually stored in "class" files. Each class file stores all the information for a particular Java class. A "class" in Java is a software construct which defines instance variables and methods, in effect, serving as a template for creating objects of a particular type. In this regard, a Java class is akin to a C++class. A very simple "Point" class, for instance, may be declared as follows.

```
class Point {
    public double x;   /* instance variable */
    public double y;   /* instance variable */
}
```

This declaration serves as a template from which "Point" objects can be instantiated.

Actual instantiation of an object occurs in a manner similar to that found in the C++programming language. For example, a variable which refers to a "Point" object can be declared as follows:

Point myPoint;

An instance of a point object is allocated as follows.

myPoint=new Point ( );

Here, one can now access variables of the "Point" object, using familiar "dot" notation for referring to the names of the variables.

myPoint.x=10;

myPoint.y=20;

Objects communicate by sending messages to each other. A recipient object responds to a message by selecting a particular method to execute. If one object wants another object to do some work on its behalf, for instance, the first object sends a message to the second object. The second object, in response, invokes the method which is appropriate for processing the message. The methods themselves, therefore, define the behavior of objects instantiated from a class. In particular, it is an object's methods which manipulate the object's data—its instance variables.

Further description of the Java Language environment can be found in Gosling, J. et al., *The Java Language Environment: A White Paper*, Sun Microsystems Computer Company, October 1995, the disclosure of which is hereby incorporated by reference.

"Visual" development environments, such as Borland's JBuilder™, Borland's Delphi™, Microsoft® Visual Basic, Microsoft® J++, and Powersoft's PowerBuilder™, are rapidly becoming preferred development tools for quickly creating production applications, including those created with the Java programming language. Such environments are characterized by an integrated development environment (IDE) providing a form "painter" (i.e., designer), a property getter/setter manager ("inspector"), a project manager, a tool palette (with objects which the user can drag and drop on forms), an editor, a compiler, and a linker (which, for a Java environment, is provided at runtime by the Java VM). In general operation, the user "paints" objects on one or more forms, using the form painter. Attributes and properties of the objects on the forms can be modified using the property manager or inspector. In conjunction with this operation, the user attaches or associates program code with particular objects on screen (e.g., button object); the editor is used to edit program code which has been attached to particular objects.

Today, many development tools provide source code generation functionality. Here, an individual developer may use a development tool, such as an "application generator," to automatically generates source code, thus lessening the drudgery of creating certain source code (particularly, boilerplate source code). A pronounced limitation of such tools is that they are "one-way." Here, once the developer edits source code created using the automation tool, the developer cannot later return to the tool for further automating generation of source code (e.g., generating code for adding new properties for objects).

This limitation does not comport with the way the developers create source code, however, particularly for components (e.g., Java "bean" components). Instead, for instance, a developer would typically want to add a property and then write some code for the property, and probably test the new property. In fact, as the development process is a highly iterative one, such a developer would likely continue adding some properties and removing other properties, until just the right combination is found which achieves the functionality sought in the program under development. On the other hand, there are "visual" design tools, such as IBM Visual Age, which let the developer develop visually (i.e., using automated code generation) but do not allow the developer to have easy access to the actual underlying source code and, thus, interfere with the way the developer really works. All told, with present-day development tools, the developer is forced to envision the "grand scheme" of the program up front, in order to use the tool. Since this is not a practical approach, the full benefit of source code automation tools has not been realized in existing development systems.

What is needed is a system with an improved code generation capability which simplifies the task of application development. In particular, what is needed is a two-way code generation tool that may be used to not only allow automated generation of code, but also allow later automated generation of aspects of the code, even though the code itself has been edited. The present invention fulfills this and other needs.

SUMMARY OF THE INVENTION

The present invention provides a development system with BeansExpress™ visual designers (i.e., wizards) and methodology allowing a developer (user) to create Java Beans-compatible components rapidly and easily, including taking an existing Java class and turning it into a Java Bean. Further, once the user has created a "Java Bean" (i.e., component), he or she can continue to use the BeansExpress visual designers and methodology as true "two-way" tools to make further changes to the generated component, as needed.

In typical operation of the system, the user may generate a bean by invoking a wizard-based interface that implements methodology for automatically generating and managing a Java Bean or simply "bean." First, the user invokes a Java Bean (JavaBean) Wizard (dialog). The user employs the Java Bean Wizard to specify the name of the bean, the package it will be in, and the class it extends from. Here, the user specifies the package he or she wants the bean to be part of. By default, this will be the name of the user's current project. Next, the user gives the bean being created a name; the user can choose a class to extend, from a drop-down list. The drop-down list presents a list of convenient classes to use for constructing a new Java Bean. The user can use one of these classes, or can click the adjacent button to display a Package browser provided by the system for specifying any existing Java class desired. The user chooses any remaining options desired, such as checking "Allow Only Java Beans" if the user wants the system to warn when the user tries to extend a Java class that is not a valid Java Bean. Finally, the user selects an OK button to indicate completion of input for the wizard. In response to the foregoing input, the system creates a Java Bean with the name the user specified, places it in the user's current project, and displays the source code generated for the bean.

Now, the user may visually interact with the bean or other existing bean by using the visual designers to manage the bean's properties, including: adding properties to the bean, adding bound and constrained properties, modifying properties of the bean, removing properties from the bean, or even generate a custom property editor. In a similar manner, the user may proceed to use the visual designers to manage the bean's events, including: adding events, listening for events, and creating custom event sets.

At this point where the user wants to modify the bean component, the system invokes the interface to its code generator (i.e., to "Jot"). In particular at this juncture, the system reads the user's source code, to provide a list of properties, events, and methods which are in the bean. The underlying source is parsed code for enumerating this information. Therefore, at this point, the system has looked at the user's source code, for determining what (e.g., properties) it already contains. This information can now be presented to the user by the property (locator) engine by displaying a property sheet that lists all of the properties and their respective types, as well as corresponding attributes (e.g., bound or constrained) and other special data associated with them. Internally, the property engine fills out a property info structure and then displays a property sheet based on that structure.

Now, the system is operating in interactive mode, waiting for the user to add a new property, for instance. To add a new property, the user inputs sufficient information into the wizard that allows the system to populate a new property info structure. Upon the user committing the change, the system generates a new property info structure internally and then writes out that change to source code. In particular, the user request is passed from the user interface back to the property engine, which emits a new property info structure. This is communicated to the code generator. Based on the contents of this new structure, the code generator writes out new source code, accordingly. In a similar manner, the system may receive and process other user requests, such as a request for the component to be a source for a new event.

DETAILED DESCRIPTION OF A PREFERRED EMBODIMENT

The following description will focus on a preferred embodiment of the present invention (and certain alternatives) embodied in a visual development environment running on an Intel 80×86-compatible computer operating under an event-driven operating system, such as the Microsoft® Windows 9x/NT environment. The present invention, however, is not limited to any particular application or any particular environment. Instead, those skilled in the art will find that the system and methods of the present invention may be advantageously applied to a variety of platforms and environments, including Macintosh, UNIX, NextStep, Linux, and the like. Therefore, the description of the exemplary embodiments which follows is for purposes of illustration and not limitation.

GENERAL ARCHITECTURE

A. System Hardware

Figure 1A:
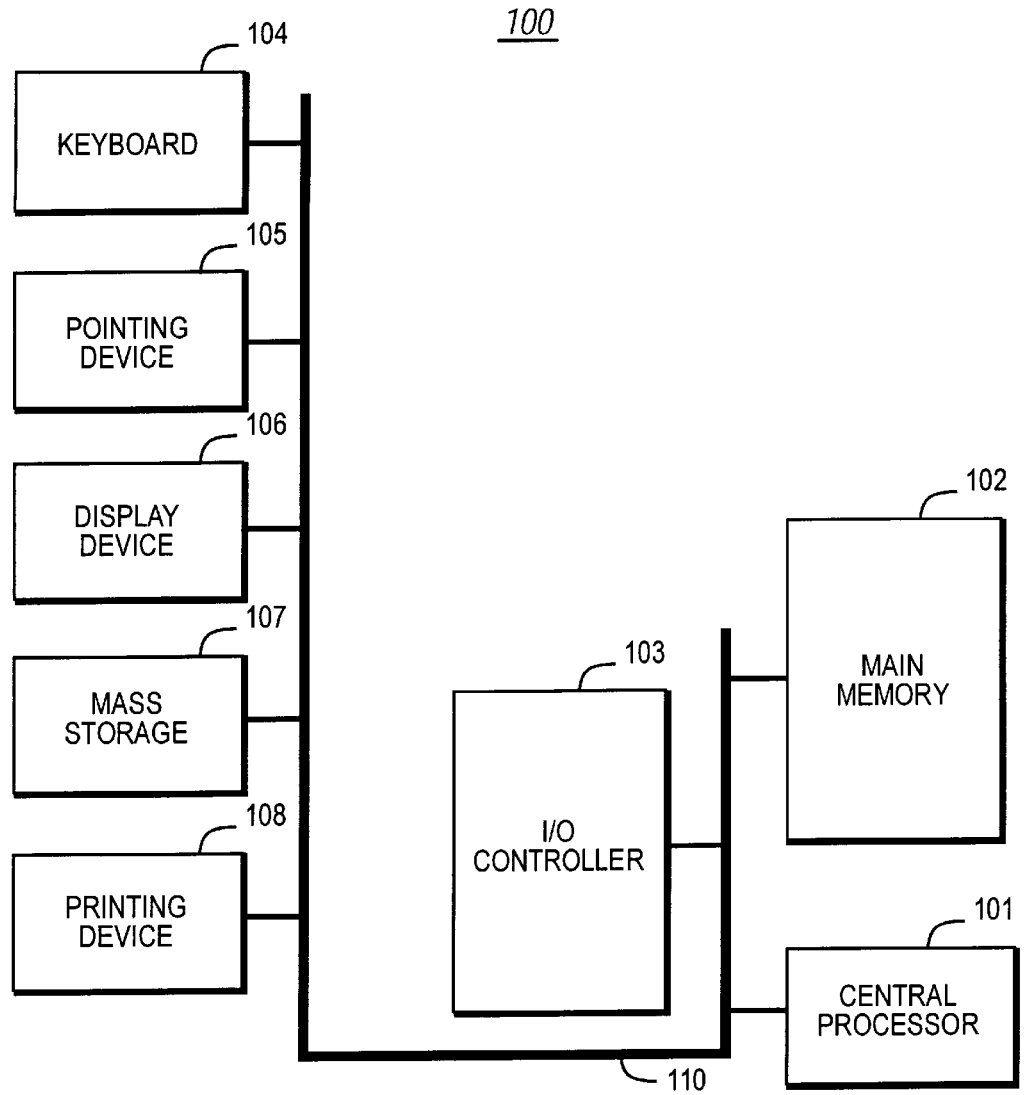
FIG. 1A is a block diagram of a computer system in which the present invention may be embodied.

The present invention may be embodied on a computer system such as the system 100 of FIG. 1A, which includes a central processor 101, a main memory 102, an input/output controller 103, a keyboard 104, a pointing device 105 (e.g., mouse, track ball, pen device, or the like), a display device 106, and a mass storage 107 (e.g., removable disk, floppy disk, fixed disk, optical disk (including CD-ROM), and the like). Additional input/output devices, such as a printing device 108, may be provided with the system 100 as desired. As shown, the various components of the system 100 communicate through a system bus 110 or similar architecture. In a preferred embodiment, the system 100 includes an IBM-compatible personal computer, available from a variety of vendors (including IBM Corp. of Armonk, N.Y.).

B. System Software

Figure 1B:
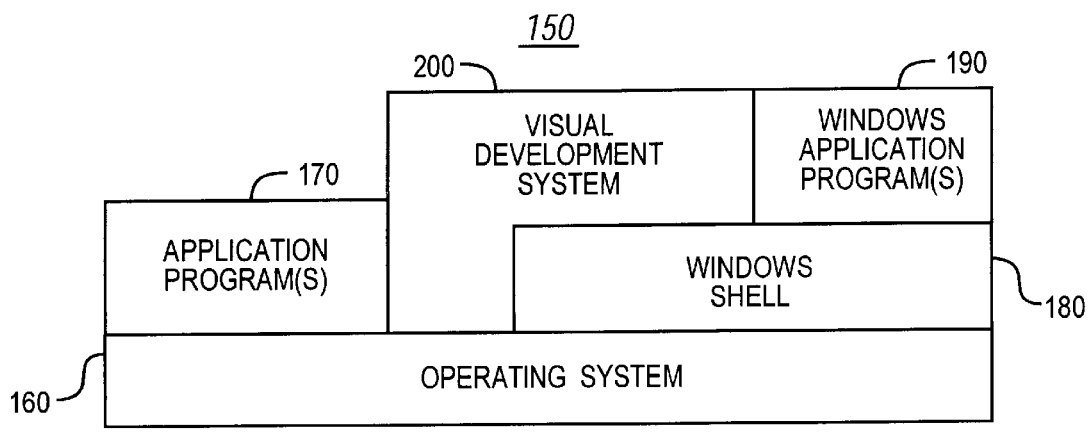
FIG. 1B is a block diagram of a software system for controlling the operation of the system of FIG. 1A.

Illustrated in FIG. 1B, a computer software system 150 is provided for directing the operation of the computer system 100. Software system 150, which is stored in system memory 102 and/or on disk storage 107, includes a kernel or operating system (OS) 160 and a window-based shell or interface 180 (e.g., graphical user interface or GUI). One or more application programs, such as application programs 170 or windows applications programs 190, may be "loaded" (i.e., transferred from storage 107 into memory 102) for execution by the system 100. OS 160 and shell 180, as well as application software 170, 190, include an interface for receiving user commands and data and displaying results and other useful information. Software system 150 also includes a visual development system 200 of the present invention for developing system and application programs. As shown, the development system 200 includes components which interface with the system 100 through shell 180, as well as components which interface directly through OS 160.

In a preferred embodiment, operating system 160 and shell 180 are provided by Microsoft® Windows 9x/Windows NT, available from Microsoft Corporation of Redmond, Wash. Those skilled in the art will appreciate that the system may be implemented in other platforms, including Macintosh, UNIX, and the like. Development system 200, on the other hand, includes JBuilder™, available from Inprise Corporation (formerly, Borland International, Inc.) of Scotts Valley, Calif. Application software 170, 190 can be any one of a variety of software applications, such as word processing, database, spreadsheet, text editors, and the like, including those created by the development system 200.

C. Development System

Figure 2A:
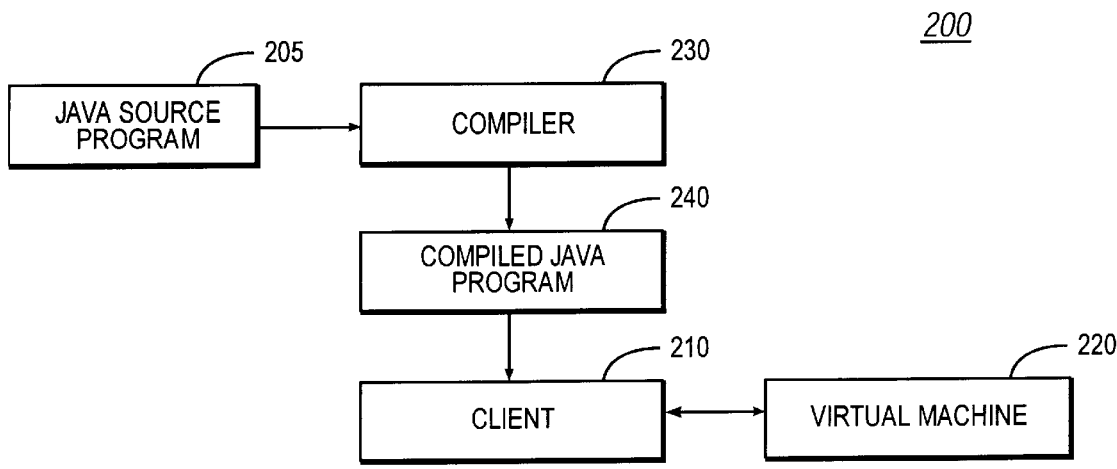
FIG. 2A is a block diagram of a Java development system.

Shown in further detail in FIG. 2A, a Java development system 200 of the present invention includes a client 210 which employs a virtual machine 220 for executing programs. In particular, the client 210 executes a "compiled" (i.e., bytecode or pseudo-compiled) Java program 240, which has been created by compiling a Java source code program or script 205 with a Java compiler 230. Here, the Java source code program 205 is an application program written in the Java programming language; the pseudo-compiled program 240, on the other hand, comprises the bytecode emitted by the compiler 230. The virtual machine 220 includes a runtime interpreter (and/or just-in-time compiler) for interpreting the Java bytecode program 240. During operation, the client 210 simply requests the virtual machine 220 to execute a particular Java compiled program.

Figure 2B:
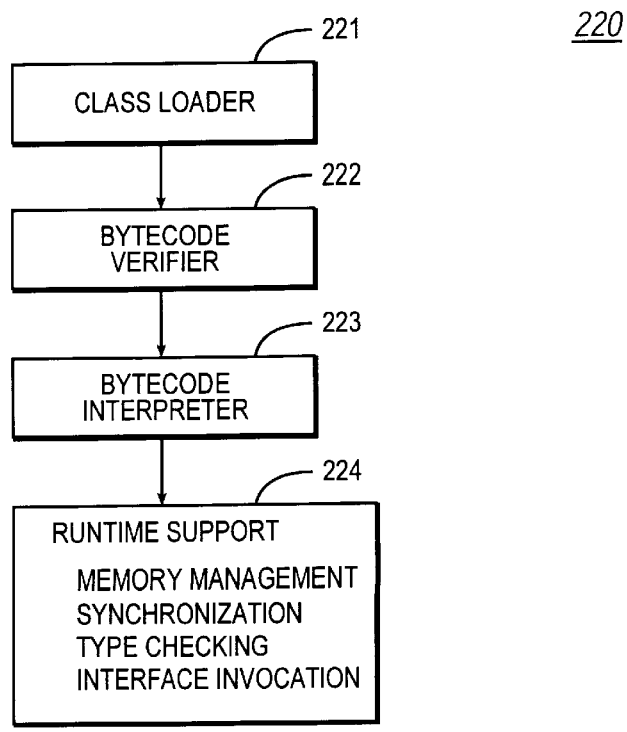
FIG. 2B is a block diagram showing further detail of the virtual machine of the Java development system of FIG. 2A.

As shown in FIG. 2B, the virtual machine 220 comprises a class loader 221, a bytecode verifier 222, a bytecode interpreter 223, and runtime support libraries 224. The class loader 221 is responsible for unpacking the class file which has been requested by a client. Specifically, the loader will unpack different sections of a file and instantiate in-memory corresponding data structures. The class loader will invoke itself recursively for loading any superclasses of the current class which is being unpacked.

The bytecode verifier 222 verifies the bytecode as follows. First, it checks whether the class has the correct access level. Since the class will access other classes for invoking their methods, the bytecode verifier must confirm that appropriate access is in place. Additionally, the bytecode verifier confirms that the bytecode which comprises the methods is not itself corrupt. In this regard, the bytecode verifier confirms that the bytecode does not change the state of the virtual machine (e.g., by manipulating pointers).

Once the bytecode has been verified, a "class initializer" method is executed. It serves, in effect, as a constructor for the class. The initializer is not a constructor in the sense that it is used to construct an instance of a class—an object. The class initializer, in contrast, initializes the static variables of the class. These comprise the variables which are present only once (i.e., only one instance), for all objects of the class.

Runtime support libraries 224 comprise functions which provide runtime support to the virtual machine, including memory management, synchronization, type checking, and interface invocation. At the client, runtime support libraries 224 are included as part of the virtual machine; the libraries are not downloaded with the Java application. The bytecode which is executed repeatedly calls into the runtime support libraries 224, for invoking various Java runtime functions.

D. General Development Interface

The present invention is embodied in a component-based, rapid application development (RAD) Java system (commercially embodied as JBuilder™). Many of the traditional requirements of programming, particularly for GUI applications, are handled automatically by the system for the programmer.

Figure 2C:
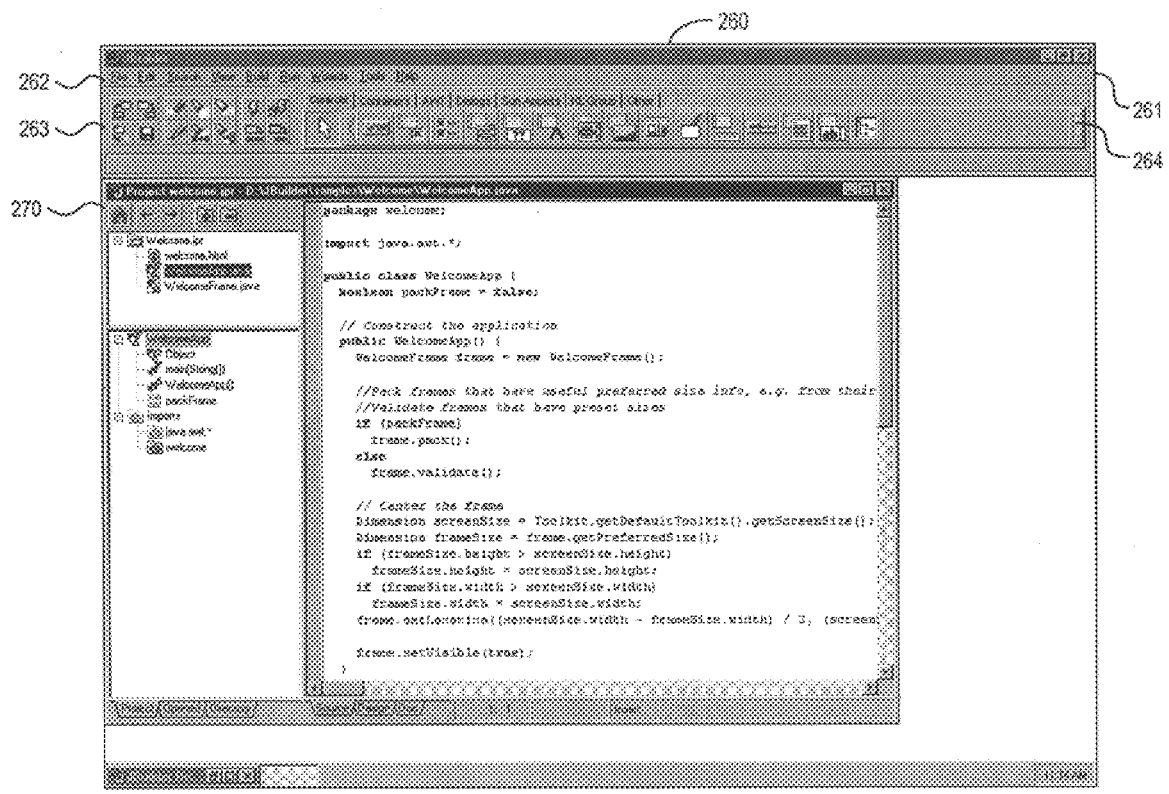
FIG. 2C is a bitmap screen shot illustrating a preferred interface of a Java-based visual development system of the present invention.

FIG. 2C illustrates a preferred interface of the Java-based visual development or programming environment 260 provided by the system. As shown, the programming environment 260 comprises a main window 261. The main window 261 itself comprises main menu bar 262, tool bar (buttons) 263, and component palette 264.

Main menu bar 262 lists user-selectable commands, in a conventional manner. The menu bar 262 is where the user selects menu commands. The following provides brief descriptions of menu commands.

| Menu | Commands for |
| --- | --- |
| File menu | Creating, opening, closing, renaming and saving files and projects; removing files from projects; configuring printers; printing files. |
| Edit menu | Copying, pasting, deleting and selecting text; undoing and redoing actions. |
| Search menu | Finding and replacing text; searching fortext incrementally and by line number; searching for text across a source path; searching for a symbol. |
| View menu | Viewing Debugger windows, a new AppBrowser, the next or previous error message, the tool bar or the Component Palette. |
| Build menu | Making or building the selected node. |
| Run menu | Running the application or applet; stepping over or tracing into code; running to the end of a selected method; pausing the program; setting watches or breakpoints; inspecting, evaluating and modifying. |
| Wizards menu | Running utility wizards for tasks such as implementing an interface, overriding a method, bundling resources, and wrapping an applet. |
| Tools menu | Displaying the Environment Options dialog; invoking the Windows Notepad and Calculator and other internal tools. |
| Help menu | Displaying documentation, such as the Help system, a BeansExpress tutorial for creating Java Bean components, the JDK API Reference, and the JBCL API Reference. Also for viewing Online web site in the user's default web browser, loading the Welcome project for experimenting, and seeing information about this release of product. |

Working in conjunction with the main menu, tool bar 263 provides the user with shortcuts to the most common commands from the main menu for commonly performed tasks, such as opening and saving a project; creating a new application; building, compiling and debugging; undoing an action; and searching and replacing text. The tool bar is configurable by the user for including icons for most of the menu commands. In an exemplary embodiment, the following are provided.

| Button | Commands for |
| --- | --- |
| File\|Open | Opens a project, file, or package. |
| File\|Close | Closes the active window. |
| File\|Save File | Saves the active file. |
| File\|Save Project | Saves the current project and all changed files that are shown in the system's project tree. |
| Edit\|Undo | Reinserts any characters deleted, deletes any characters inserted, replaces any characters the user overwrites, or moves the cursor back to its prior position. |
| Edit\|Redo | Reverses the effects of an Undo. |
| Search\|Find | Searches for text within the active file. |
| Search\|Replace | Replaces specified text with other specified text in the current file. |
| Search\|Search | Again Finds the next occurrence of a search string in the current file. |
| Search\|Browse | Loads the specified class into the AppBrowser. The class must be on the imports path of the current file. |
| Run\|Run | Compiles and runs the application using the startup parameters in the Parameters dialog box. |
| Run\|Debug | Compiles the program and runs it in the Debugger using the startup parameters in the Parameters dialog box. |
| Build\|Make | Compiles any .java files within the selected node that have outdated or nonexistent .class files. Also compiles any of the node's imported files that the node depends on which have outdated or nonexistent .class files |
| Build\|Rebuild | Compiles all .java files within the selected node, regardless of whether their .class files are outdated. Also compiles the imported files upon which the node depends, regardless of whether their .class files are outdated. |

By placing the mouse pointer over the tool bar buttons, without clicking, the user can view flyover labels of the buttons.

The component palette 264 displays components available in the JBuilder component library. Components are the elements which a user employs to build his or her applications. They include all of the visible parts of an application, such as dialog boxes and buttons, as well as those which are not visible while the application is running (e.g., system timers). In the programming environment 260, components are grouped functionally on different pages of the component palette 264. Each functional group is identified by a tab member, which includes a label indicating the particular nature of the group. The palette can incorporate user-created custom controls, which the user installs onto the palette. Additionally, the user can install third-party components.

In the currently-preferred embodiment, the present invention is implemented in a Java-based development system, such as JBuilder™ 2 (available from Inprise Corporation of Scotts Valley, Calif.), operating on an appropriately-programmed computer. Description of JBuilder™ is provided by the following manuals (available from Inprise Corporation of Scotts Valley, Calif.): *JBuilder User's Guide* (Part No. JBA1310WW21770), *JBuilder Programmer's Guide* (Part No. JBA1310WW21771), and *Java Beans Component Library Reference Volumes* 1 & 2 (Part Nos. JBA1310WW21772 and JBA1310WW21773). The disclosures of the foregoing are hereby incorporated by reference. Further description of the development system may be found, for example, in commonly-owned U.S. patent application Ser. No. 08/992,434, filed Dec. 17, 1997, and entitled, DEVELOPMENT SYSTEM WITH APPLICATION BROWSER USER INTERFACE. The complete disclosure of the foregoing application is hereby incorporated by reference.

The following description will focus on those features of the development system 200 which are helpful for understanding system and methods of the present invention for implementing visual design tools for creating and maintaining "beans"—that is, Java Beans components.

VISUAL DESIGN TOOLS FOR CREATING AND MAINTAINING JAVA BEANS COMPONENTS

A. General

The Java Bean (or JavaBean) architecture or component model, as defined by Sun Microsystems, provides standard design patterns for declaring properties, methods, and events (PME) for components. It provides a defined model of how a reusable component in Java should be packaged, so that the component could be freely used in any Java development environment. This allows users to use "bean" components in Java-compliant development environments, such as JBuilder or Symantec Visual Café. Suppose, for instance, one had a "customer ID" property, which comprised a data type of type string. In such a case, a "getter" function would be defined as "get customer ID" that took no arguments and returned a result of type string; a "setter" function would be defined as "set customer ID" that took a string argument and returned no result (i.e., type void). Internally, customer ID is treated as a property.

In order to support this level of functionality, the Sun Java Bean model specifies a set of design patterns of how component should be coded (i.e., structured in source code). Since the component is used within a development environment, "bean info" (i.e., information) is provided as a meta-data companion to a Java bean. For instance, if one had an "account balance" Java bean, there would also exist an "account balance" Java bean info class. The particular host development tool could load this information for determining all the properties and all the events in the bean, and other related meta-data. Most importantly, the bean info describes which properties are going to be exposed (to the developer user of the host development tool).

The present invention provides a wizard-based tool which automatically generates code to define property setters and getters, accessor methods, event listener and registration mechanisms, and the like. In use, the user enters information about each particular property (e.g., name and type of property), together with various options for the property, such as whether the user desires a getter and a setter method to access the property. In response to this input, the system emits source code for the component. In contrast to existing systems, however, the system of the present invention allows the source code to be modified, thereby providing a two-way tool for creating and managing a Java bean component.

B. BeansExpress Wizard User Interface and Operation

The present invention provides a development system with BeansExpress™ visual designers (i.e., wizards) and methodology allowing the developer (user) to create Java Beans-compatible components rapidly and easily, including taking an existing Java class and turning it into a Java Bean. Further, once the user has created a "Java Bean" (i.e., component), he or she can continue to use the BeansExpress visual designers and methodology as true "two-way" tools to make further changes to the generated component, as needed.

1. "Java Bean" Components

At the outset, it is helpful to briefly explain what a "Java Bean" (also "JavaBean" or simply, "bean") is. A Java Bean is a collection of one or more Java classes, often bundled into a single JAR (Java Archive) file, that serves as a self-contained, reusable component. A Java Bean can be a discrete component used in building a user interface, or a non-UI component such as a data module or computation engine. At its simplest, a Java Bean is a public Java class that has a constructor with no parameters. Java Beans usually have properties, methods, and events that follow certain naming conventions (also known as "design patterns").

Like other types of components, Java Beans are reusable pieces of code that can be updated with minimal impact on the testing of the program they become a part of. Java Beans have some unique advantages over other components, however. They are pure Java, cross-platform components. They can be installed on the IDE (e.g., JBuilder) Component Palette and used in the construction of one's program, or they can be used in other application builder tools for Java. They can be deployed in .JAR files.

2. Generating a Bean Class

Figure 3:
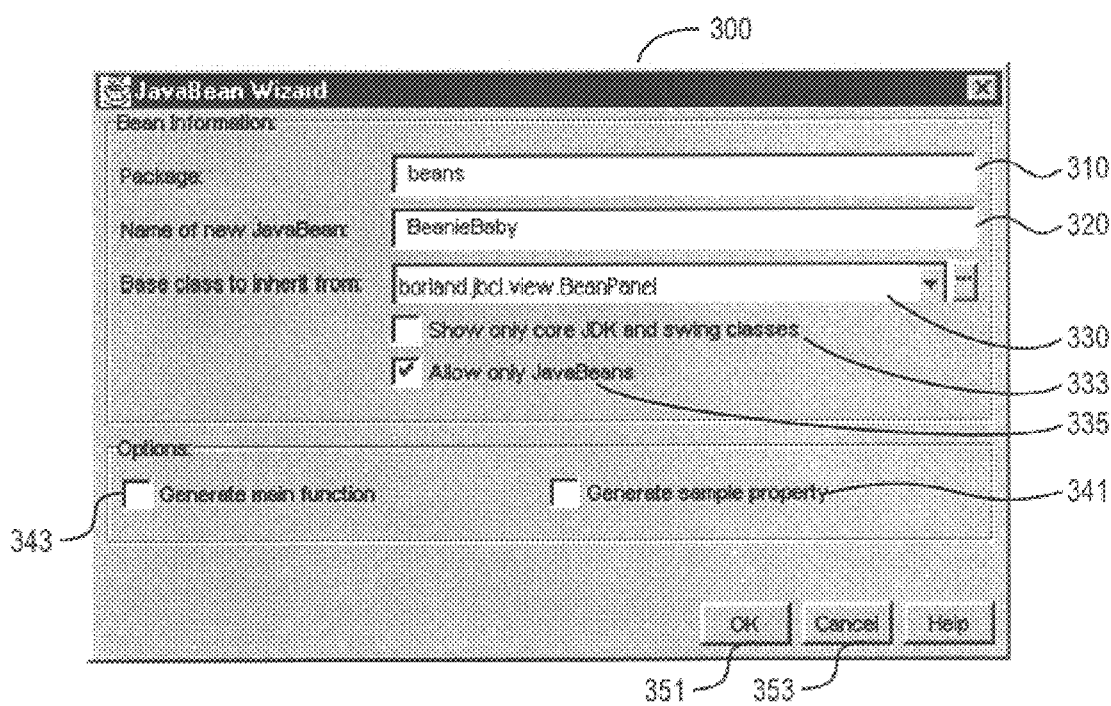
FIG. 3 is a bitmap screen shot illustrating an exemplary wizard-based interface and methodology for generating a "bean" in the system.

As illustrated in FIG. 3, an exemplary wizard-based interface and methodology for generating a bean class in the system 200 is as follows. First, the user invokes a Java Bean (JavaBean) Wizard (dialog) 300 by selecting Choose FileI-New to display an "Object Gallery," and selecting (e.g., double-clicking) a Java Bean icon to start the Java Bean Wizard. The user employs the Java Bean Wizard 300 to specify the name of the bean, the package it will be in, and the class it extends from. Specifically within the Java Bean Wizard, the user proceeds as follows. The user specifies the package he or she wants the bean to be part of, in Package input field 310. By default, this will be the name of the user's current project. Next, the user gives the bean being created a name at Name input field 320. By using the Base Class to Inherit From drop-down list 330, the user can choose a class to extend. The drop-down list presents a list of convenient classes to use for constructing a new Java Bean. The user can use one of these classes, or can click the adjacent button to display a Package browser provided by the system for specifying any existing Java class desired. By checking the Show Only Core JDK (I.e., Java Development Kit) and Java Swing Classes option 333 below the list 330, the user can constrain the system to only display core JDK and Java Swing components in the drop-down list.

Now, the user chooses the remaining options desired; none of them are required. The user checks Allow Only Java Beans 335 if the user wants the system to warn when the user tries to extend a Java class that is not a valid Java Bean. The user checks Generate Sample Property 341 if he or she wants the system to add a property called "sample" to the bean. This option allows the user to see how the system generates the required code for a property. The user can remove this property later, or make it an actual property that the bean can use. The user checks Generate Main Function 343 if he or she wants the system to place a main( ) function within the bean so it can be used as the starting point of the Java program. Finally, the user selects OK button 351 to indicate completion of input for the wizard. Alternatively, the user can cancel the operation, by selecting Cancel button 353.

In response to the foregoing input, the system creates a Java Bean with the name the user specified, places it in the user's current project, and displays the source code generated for the bean. The following is exemplary code generated for the settings shown for the settings selected for Wizard dialog 300.

```
package beans;
import java.awt.*;
import borland.jbcl.view.BeanPanel;
public class BeanieBaby extends BeanPanel {
  BorderLayout borderLayout1 = new BorderLayout();
  public BeanieBaby() {
    try {
      jbInit();
    }
    catch (Exception e) {
      e.printStackTrace();
    }
  }
  void jbInit() throws Exception(
    this.setLayout(borderLayout1);
  }
}
```

Note that the system named the bean (as the user specified) and extended the designated class. Furthermore, the class is declared as public; also, it has a parameterless constructor. Even in this early state of development, the class is a valid Java Bean. As described below, however, the system provides visual designers and additional methodology for allowing the user to further customize the bean.

3. Adding Properties to the Bean

Properties define the attributes the bean has. For example, the background property describes the color of the background for the component. Java Beans properties usually have both read and write access methods, also known as a "getter" (reader) and a "setter" (writer), respectively. A getter method returns the current value of the property; a setter method sets the property to a new value.

Figure 4:
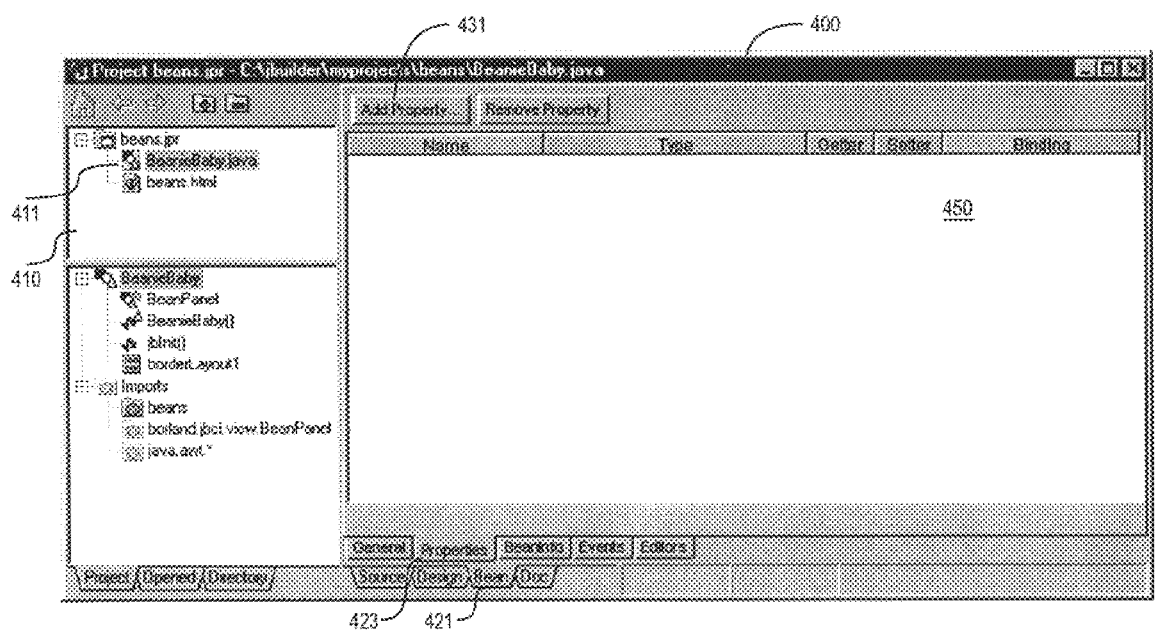
FIG. 4 is a bitmap screen shot illustrating a Properties Designer interface for assisting the user with the task of adding a property to a bean.

As illustrated in FIG. 4, the system 200 provides a Properties Designer interface 450 for assisting the user with the task of adding a property to the bean. The user proceeds as follows. From the AppBrowser interface 400, the user invokes the Properties Designer by selecting the bean component (at 411) in the Navigation pane 410 and clicking the Bean tab 421 to display the BeansExpress designers. From there, the user can select a Properties tab 423 to display the Properties Designer 450.

Figure 5:
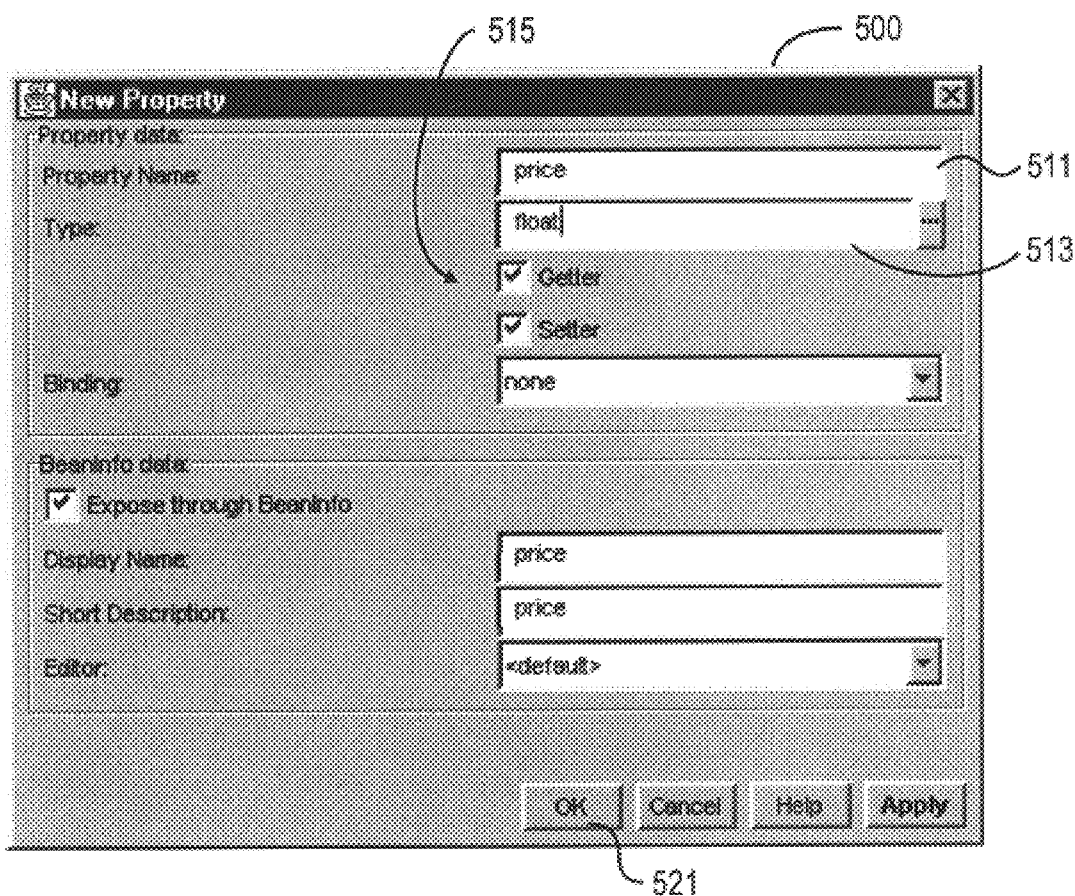
FIG. 5 is a bitmap screen shot illustrating a New Property dialog for assisting the user with the task of adding a property to a bean.

The user may now proceed to add a property as follows. First, the user selects the Add Property button 431. A New Property dialog 500 appears, as shown in FIG. 5. The user specifies the name of the property in the Property Name input field 511, and then specifies a type in the Type input field 513. The user can enter one of the Java types or use the Package browser to select any object type, including other Java Beans. By checking the Getter and Setter check boxes 515, the user can indicate that the system should generate the methods to both get and set the property value. If the user wants to make a property read-only, the user "unchecks" the Setter check box. The Display Name and Short Description are filled in automatically with default values. After entering desired input values, the user selects OK button 521 to indicate completion of input for the designer.

In response, the system generates the necessary code for the property and adds the property to the Properties Designer grid. The user can view the read and write access methods added to the IDE's Component Tree for the bean by clicking the Source tab (shown in FIG. 4). The following is exemplary code generated for the settings shown for the dialog 500.

```
package beans;
import java.awt.*;
import borland.jbcl.view.BeanPanel;
public class BeanieBaby extends BeanPanel {
  BorderLayout borderLayout1 = new BorderLayout( );
  private float price;         // Added a private price field
  public BeanieBaby( ) {
    try {
      jbInit( );
    }
    catch (Exception e) {
      e.printStackTrace( );
    }
  }
  void jbInit( ) throws Exception(
    this.setLayout(borderLayout1);
  }
  public void setPrice(float newPrice) {
    // Added a method to change the price value
    price = newPrice;
  }
  public float getPrice( ) {
    // Added a method to obtain the price value
    return price;
  }
}
```

As shown, the system automatically added a private price field to the BeanieBaby class. The price field holds the value of the property. Usually a property field should be declared as private so that only the getter and setter methods can access the field. The system also generated a setprice( ) method (i.e., writer) that can change the value of the new field, and generated a getPrice( ) method (i.e., reader) that can get the current value of the field. When the bean is installed on system's Component Palette and the user drops the bean on the UI Designer, the price property will appear in the Component Inspector so that the user can modify its value. All the code to get and set the price property is in place.

4. Modifying a Property

Once the user has added a property to the bean, he or she can modify it at any time with the Properties Designer. To modify a property, the user proceeds as follows. First, the user selects the bean using the Navigation pane. The user clicks the Bean tab to display the BeansExpress designers. Then, the user clicks the Properties tab and selects any of the fields in the Properties Designer grid. Now, the user can make any desired changes. For example, the user can change the type of the property by entering another type. The system reflects the changes made in the Properties Designer in the source code of the bean. In a complimentary manner, the user can also make changes directly in the source code and the BeansExpress designers will automatically reflect the changes (if the changes have been made correctly).

5. Removing a Property

To remove a property from the bean, the user selects the bean that contains the property in the Navigation pane. The user clicks the Bean tab to display the BeansExpress designers. Then, the user clicks the Properties tab, and selects the property desired to be removed in the Properties Designer grid. Finally, the user clicks "Remove Property" (illustrated in FIG. 4). In response to the input, the system automatically removes the property field and its access methods from the source code. This action can be confirmed by the user by clicking the Source tab.

6. Adding Bound and Constrained Properties

The BeansExpress wizard can generate the necessary code to create bound and constrained properties. To add a bound or constrained property, the user proceeds as follows. First, from the Properties Designer, the user clicks the Add Property button to display the New Property dialog box. Here, the user specifies a property name and type. A Binding drop-down list is provided to specify the property as bound or constrained. After completion of input, the user closes the dialog by selecting OK.

If the property the user added is a bound property, the system adds the private property field to the class and generates its read and write methods. It also instantiates an instance of the PropertyChangeSupport class. For example, the following is the code added for a bound property called allTiedUp.

```
public class BeanieBaby extends BeanPanel {
    // ...
    private String allTiedup;
    private transient PropertyChangeSupport propertyChangeListeners
        = new PropertyChangeSupport (this);
    // ...
    public void setAllTiedUp(String newAllTiedUp) {
        String oldAllTiedUp = allTiedup;
        allTiedup = newAllTiedUp;
        propertyChangeListeners.firePropertyChange("allTiedUp",
            oldAllTiedUp, newAllTiedUp);
    }
    public String getAllTiedUp( ) {
        return allTiedUp;
    }
}
```

Note that the setAllTiedUp( ) method includes the code to notify all listening components of changes in the property value. The system also generates the event-listener registration methods that are called by listening components that want to be notified when the property value of allTiedUp changes, such as the following.

The code the system generates for a constrained property is similar except the listeners have the opportunity to reject the change in property value.

7. Creating a BeanInfo Class

The user can customize how his or her bean appears in visual tools, such as JBuilder, using a BeanInfo class. For example, the user might want to hide a few properties so they do not appear in the system's Component Inspector. Such properties can still be accessed programmatically, but users (particularly, other developers) cannot change their values at design time. BeanInfo classes are optional. The user can use the BeansExpress wizard to generate a BeanInfo class automatically to customize one's bean.

The user can specify BeanInfo data for a property when the user uses the New Property dialog box (FIG. 5). To hide a property so it does not appear in visual design tools such as the system's Component Inspector, the user leaves the Expose through BeanInfo option unchecked. To provide a localized display name for the property, the user enters the property name desired to be used in the Display Name field. To provide a short description of this property, the user enters the description in the Short Description field. The system displays this text as a tool tip in the Component Inspector for this property. If the user has created a property editor that can edit this field, the user specifies the property editor in the Editor field. The Editor field displays all editors in scope that match the given property type.

Figure 6:
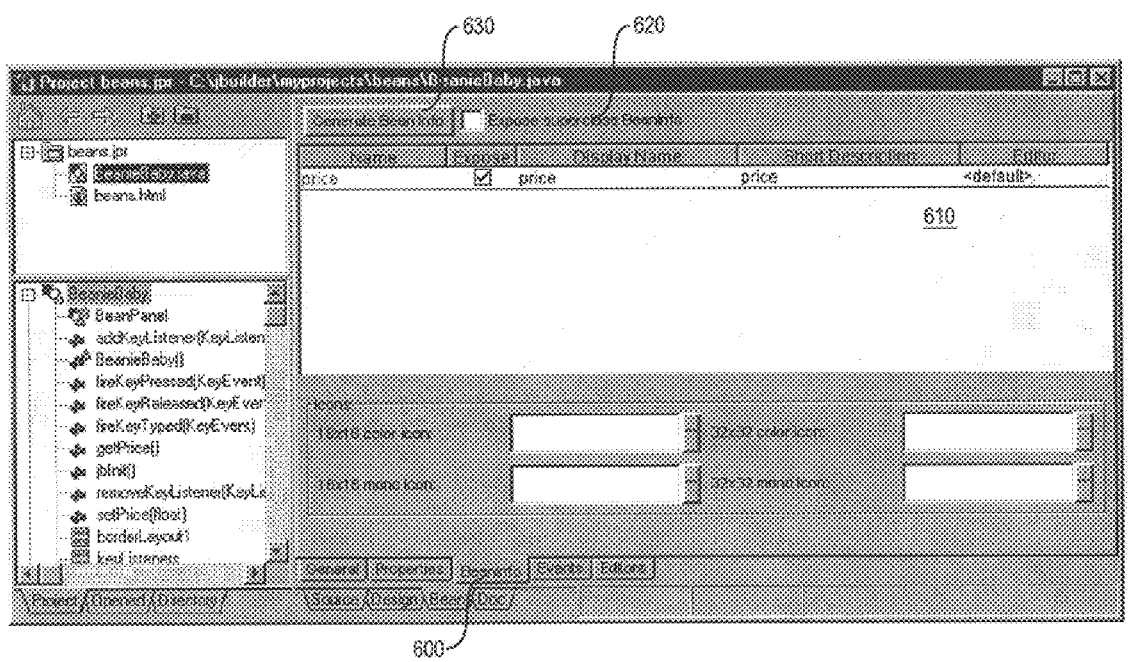
FIG. 6 is a bitmap screen shot illustrating a Bean Info Designer for assisting a user with modifying BeanInfo data for a property.

The BeanInfo Designer 600, illustrated in FIG. 6, provides a way to modify BeanInfo data for a property, including letting the user specify the icon(s) desired to be used to represent one's bean in an application builder such as the JBuilder; it also generates the BeanInfo class automatically. The BeanInfo Designer displays all the properties (at 610) the user has added to his or her bean. If the user changes his or her mind about the BeanInfo data entered for a property, he or she can edit one or more of these fields in the grid. Only the name of the property cannot be changed. To provide an image to use as an icon to represent one's bean, specify one or more images in the Icons boxes. The Icons boxes let the user specify different icons to use for both color and mono environments. If the super-class of the user's bean has a BeanInfo class and the user wants its BeanInfo data exposed in the BeanInfo class for one's bean, the user checks the Expose Superclass BeanInfo check box 620. The generated code will now include a getAdditionalBeanInfo( ) method that returns the BeanInfo data of the class the user's bean extends.

To generate a BeanInfo class for the user's bean, the user clicks the Generate Bean Info button 630. In response, the system creates a BeanInfo class for the user, with the class appearing in the Navigation pane. To see the generated code, the user selects the new BeanInfo class in the Navigation pane and the source code appears.

```
public synchronized void
removePropertyChangeListener(PropertyChangeListener listener) {
    propertyChangeListeners.removePropertyChangeListener (listener);
}
tl,3 public synchronized void addPropertyChangeListener(PropertyChangeListener
listener) {
    propertyChangeListeners.addPropertyChangeListener(listener);
}
```

The user can later modify a BeanInfo class, if desired. To change the BeanInfo class for the bean with BeansExpress, the user proceeds as follows. First, the user selects the bean in the Navigation pane, and then clicks the BeanInfo tab to display the BeanInfo Designer. Now, the user can make changes in the grid, and then click the Generate Bean Info button again. The user is warned that the action will result in overwriting of the existing BeanInfo class. If the user chooses OK, the class is overwritten with the new BeanInfo data.

8. Adding Events to the Bean Component

A Java Bean can generate (or fire) events, sending an event object to a listening object, and can listen for events and respond to them when they occur. The BeansExpress wizard can generate the code that makes the user's bean capable of doing one or both of these.

Figure 7:
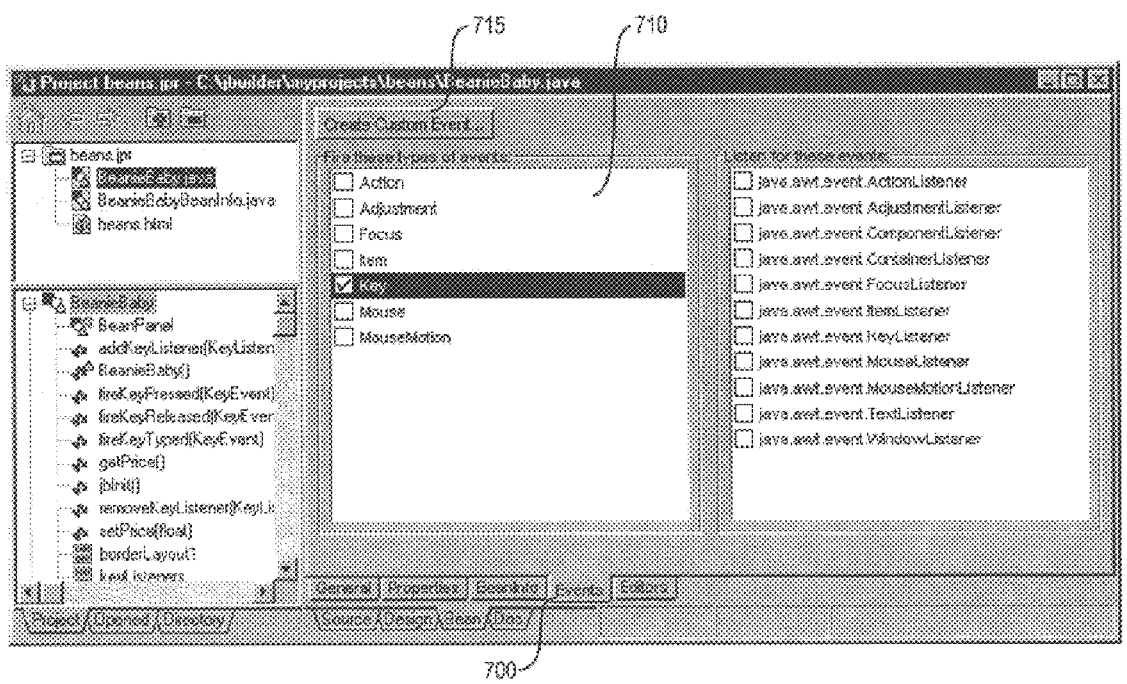
FIG. 7 is a bitmap screen shot illustrating an Events Designer for assisting with the process of making one's bean capable of sending an event object to listening components.

The process of making one's bean capable of sending an event object to listening components is facilitated by use of an Events Designer 700, illustrated in FIG. 7. After selecting the bean in the Navigation pane, the user clicks the Bean tab to display the BeansExpress designers. Upon the user clicking the Events tab, the system displays the Events Designer 700. Now, the user selects the events he or she wants the bean capable of firing in the left window, shown at 710. In response, the Events Designer adds the event-registration methods to the user's bean. These methods are called by components that want to be notified when these types of events occur. For example, if the user selects Key events at window 710, the following methods are added to the bean.

```
package myBeans;
import java.awt.*;
import borland.jbcl.view.BeanPanel;
import java.awt.event.*;
import java.util.*;
public class BeanieBaby extends Beanpanel {
    public BeanieBaby( ) {
    }
    private transient Vector keyListeners;
    public synchronized void addKeyListener(KeyListener 1) {
        Vector v = keyListeners == null ? new Vector(2) : (Vector)
keyListeners.clone ( );
        if (!v.contains(1)) {
            v.addElement(1);
            keyListeners = v;
        }
    }
}
```

When a component wants to be notified of a key event occurring in the bean, it calls the addKeyListener( ) method of the bean and that component is added as an element in KeyListeners. When a key event occurs in the bean, all listening components stored in KeyListeners are notified. The class also generates fire<event>methods that send an event to all registered listeners. One such event is generated for each method in the Listener's interface. For example, the KeyListener interface has three methods: keyTyped( ), keypressed( ), and keyReleased( ). In response, the Events Designer adds the following three fire<event>methods to the bean class.

```
protected void fireKeyTyped(KeyEvent e) {
    if (keyListeners != null) {
        Vector listeners = keyListeners;
        int count = listeners.size();
        for (int i = 0; i < count; i++)
            ((KeyListener) listeners.elementAt(i)).keyTyped(e);
    }
}
protected void fireKeyPressed(KeyEvent e) {
    if (keyListeners != null) {
        Vector listeners = keyListeners;
        int count = listeners.size();
        for (int i = 0; i < count; i++)
            (KeyListener) listeners.elementAt(i) .keyPressed(e);
    }
}
protected void fireKeyReleased(KeyEvent e) {
    if (keyListeners !=null) {
        Vector listeners = keyListeners;
        int count = listeners.size();
        for (int i = 0; i < count; i++)
        ((KeyListener) listeners.elementAt(i)).keyReleased(e);
    }
}
```

Once the user has made the bean capable of generating events, those events will appear in the system's Component Inspector when the user drops the bean on the UI Designer.

9. Listening for Events

The user can also make the bean a listener for events that occur in other components. To make the bean a listener, the user selects one of the event types to listen for in the Events Designer. As soon as the user checks one of the event types, the Events Designer implements the associated listener interface in the bean. For example, if the user checked java.awt.event.KeyListener, the phrase implements KeyListener is added to the declaration of the bean and the KeyPressed( ), KeyReleased( ), and KeyTyped( ) methods are implemented with empty bodies. For instance, the following is a bean that includes the generated code to implement the KeyListener interface.

```
package myBeans;
import java.awt.*;
import com.sun.java.swing.JPanel;
import java.awt.event.*;
public class JellyBean extends JPanel implements KeyListener { //
implements KeyListener
    BorderLayout borderLayout1 = new BorderLayout( );
    public JellyBean( ) {
        try {
            jbInit( );
        }
        catch (Exception e) {
            e.printStackTrace ( );
        }
    }
    void jbInit( ) throws Exception {
        this.setLayout (borderLayout1);
    }
    public void keyTyped(KeyEvent parm1) {    // Adds new method
    }
    public void keyPressed(KeyEvent parm1) {    // Adds new method
    }
    public void keyReleased(KeyEvent parm1) {    // Adds new method
    }
}
```

If the bean is registered with another component as a listener (by calling the event-registration method of the component), the source component calls one of the methods in the listening component when that type of event occurs. For example, if a KeyPressed event occurs in the source component, the KeyPressed( ) method is called in the listening component. Therefore, if the user wants the component to respond in some way to such an event, the user simply writes the code that responds within the body of the KeyPressed( ) method, for example.

10. Creating a Custom Event Set

Occasionally the user might want to create a custom event set to describe other events that can occur in the bean. For example, if the bean implements a password dialog box, the user might want the bean to fire an event when a user successfully enters the password, or to fire another event when the user enters the wrong password. Using the BeansExpress wizard, the user can create the custom event set that handles these situations.

Figure 8:
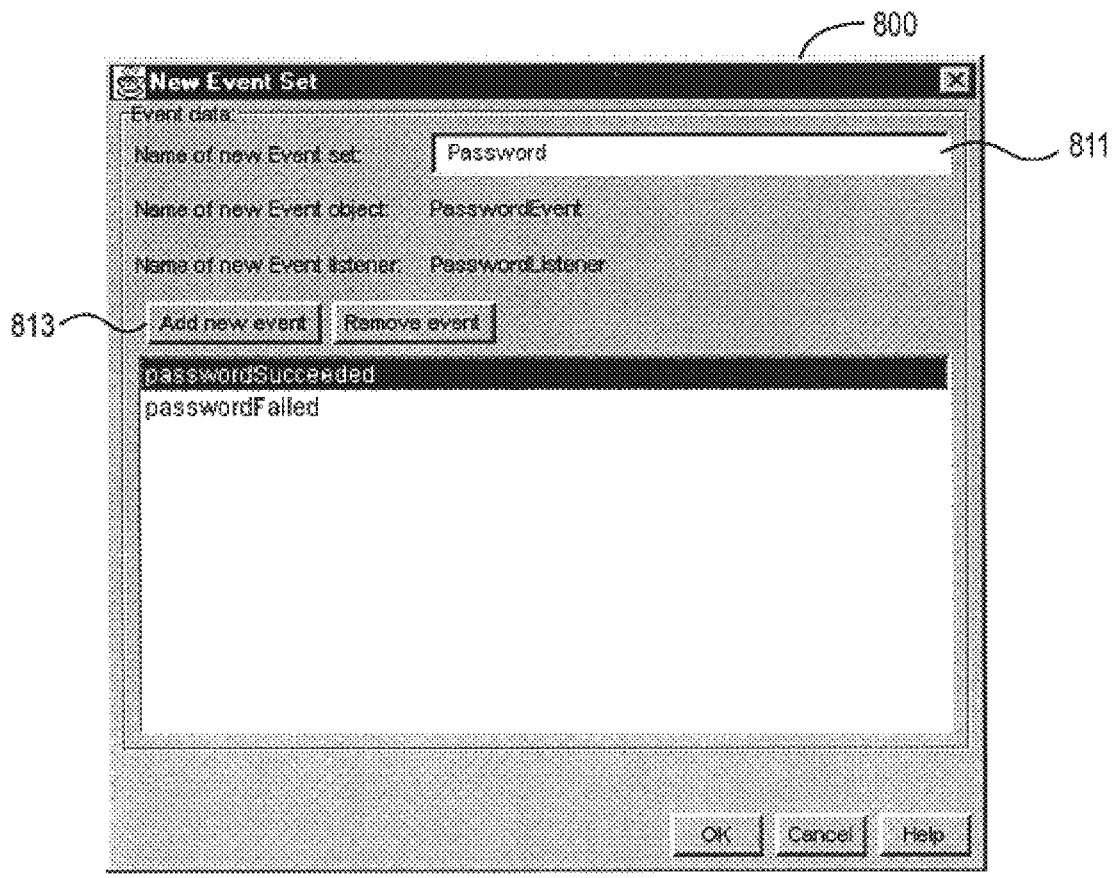
FIG. 8 is a bitmap screen shot illustrating a New Event Set dialog box for assisting with the task of specifying a new event set.

To create a custom event set, the user first selects the bean that contains the property in the Navigation pane. Then the user clicks the Bean tab to display the BeansExpress designers. After clicking the Events tab, the user clicks the Create Custom Event button, shown at 715 in FIG. 7. In response, the system displays the New Event Set dialog box, illustrated at 800 in FIG. 8. Here, the user specifies the name of the event set in the Name edit field 811. The names of the event object and the event listener are generated from the name of the event set; they are displayed in the dialog box. The user selects the dataChanged item and changes it to the name of the first event. To add more events, the user chooses the Add New Event button 813 for each event and changes the added item to the names of the user's remaining events.

In response to the user clicking OK, the new event set is added to the list of event types that can be fired in the Events Designer. The system generates the event object class for the example event set as follows.

```
package myBeans;
import java.util.*;
public class PasswordEvent extends EventObject {
    public PasswordEvent(Object source) {
        super(source);
    }
}
```

The system also generates the Listener interface for the event set.

```
package myBeans;
import java.util.*;
public interface PasswordListener extends EventListener {
    public void passwordSuccessful(PasswordEvent e);
    public void passwordFailed(PasswordEvent e);
}
```

11. Creating a Property Editor a. General

A property editor is an editor for changing property values at design time. The user can see several different types of property editors in the system's Component Inspector. For example, for some properties, the user simply types in a value in the Component Inspector, and by so doing, changes the value of the property. This is the simplest type of property editor. For other properties, the user employs a choice menu (drop-down list) to display all the possible values and selects the value desired from that list. Colors and fonts have property editors that are actually dialog boxes that the user can use to set their values. The Java Beans Component Library supplies property editors for the primitive Java data types. When the user creates a Java Bean, he or she can create new property classes and editors capable of editing their values. The BeansExpress wizard helps the user create property editors that display a list of choices.

To begin creating a property editor for a property, the user proceeds as follows. The user clicks or selects the Editors tab in BeansExpress, and then clicks the Create Custom Editor button. A New Property Editor dialog box appears. There, the user specifies the name of the property editor in an Editor Name edit field. Typically, the user gives the property editor the same name as the property the editor will edit with the word "Editor" appended. The user selects the type of editor desired from an Editor Type drop-down list. The appearance of the New Property dialog box changes depending on which type of editor is selected. The following illustrates how to create a property editor for different types.

b. Creating a String List Editor

Figure 9:
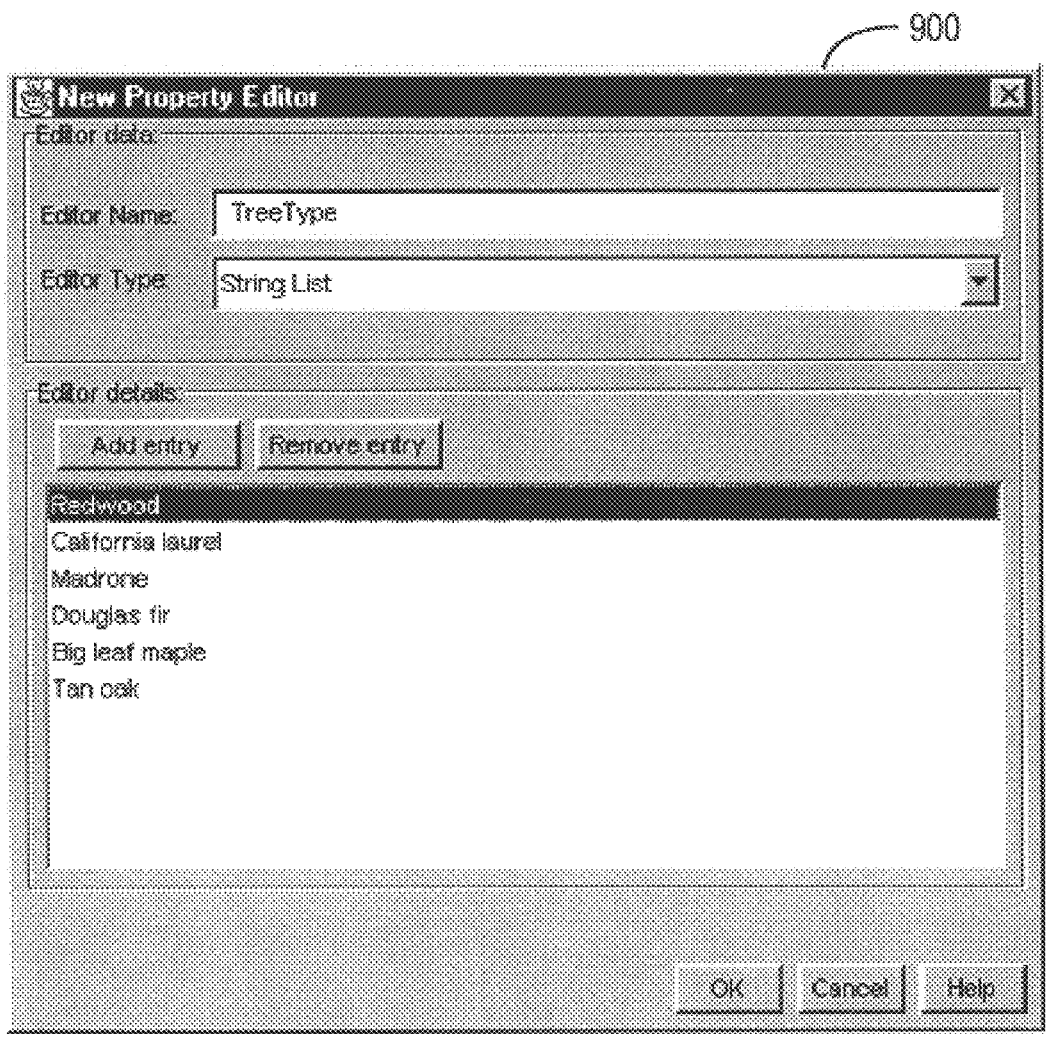
FIGS. 9–10 are bitmap screen shots illustrating a New Property Editor dialog box for assisting with the task of creating a new property editor.

A String List is a simple list of strings. It appears in the Component Inspector as a drop-down list containing the strings specified. When the user uses the list to select an entry, the property being edited is set to the selected value. To add items to a String List editor, the user first chooses "Add Entry" for each item desired to appear in the list. In each entry, the user enters the string desired to appear. FIG. 9 illustrates how a resulting a New Property Editor dialog box 900 might appear. Upon the user choosing OK, a new property editor class is created. To view the generated code, the user selects the property editor class in the Navigation pane and clicks the Source tab.

c. Creating a String Tag List Editor

Figure 10:
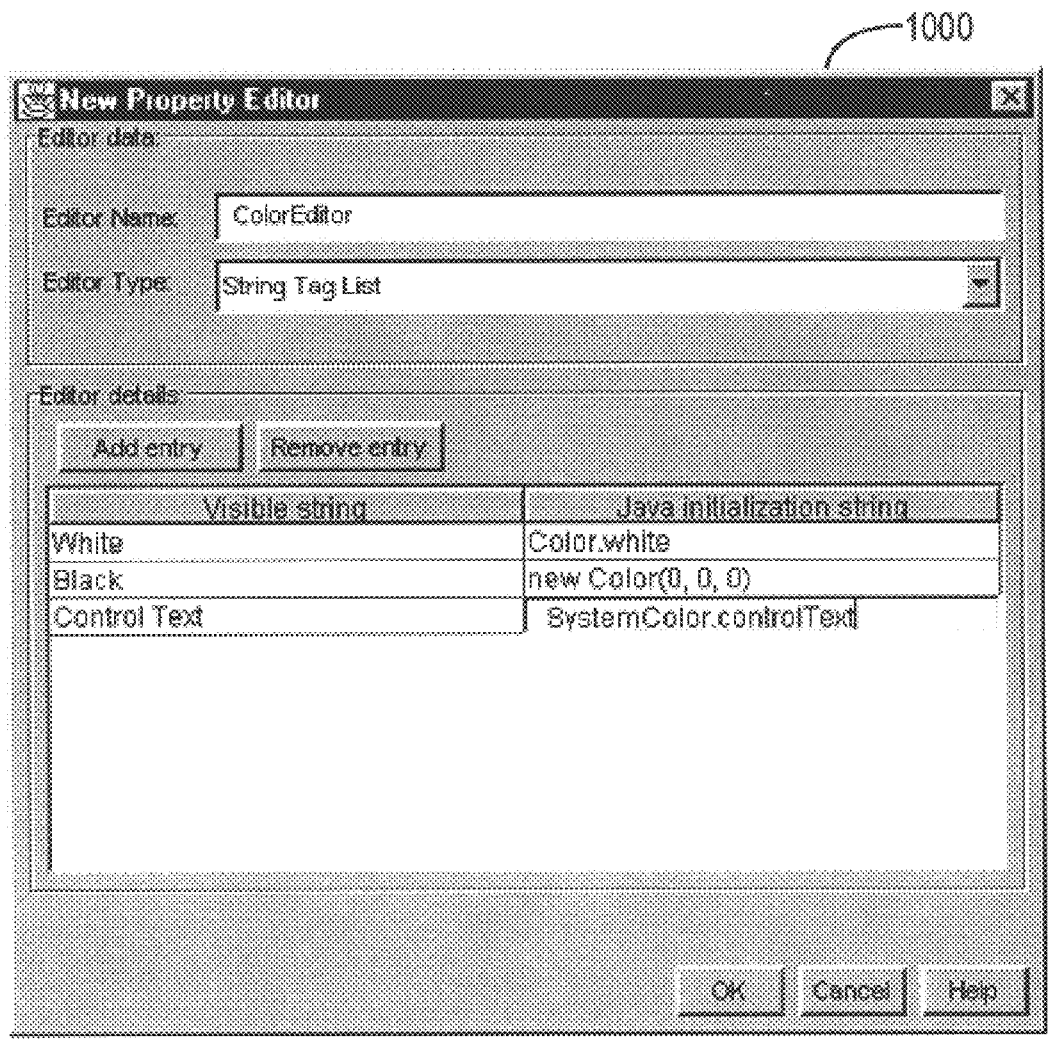

A property editor that is a String Tag List also presents a list of strings to the user in the Component Inspector. When the user selects one of the items, the specified Java initialization string is used to set the property. A Java initialization string is the string the system uses in the source code it generates for the property. To add items to a String Tag List editor, the user chooses "Add Entry" for each item desired to appear in the list. In each entry, the user enters the string desired to appear, together with its associated Java initialization string. To include a string in the list of Java initialization strings, one puts quotation marks (") before and after the string, as if one were entering it in source code. FIG. 10 illustrates how a resulting New Property Editor dialog box 1000 might appear. Upon the user choosing OK, a new property editor class is created. To view the generated code, the user selects the property editor class in the Navigation pane and clicks the Source tab.

d. Creating a Custom Component Property Editor

The user can also use his or her own custom component to edit the value of a property. Selecting this choice generates a skeleton property editor that uses the custom editor specified to actually edit the property. To specify a custom component property editor, the user enters the name of the custom component in the Custom Editor Name box and checks a "Support paintValue( )" option if the custom editor is to paint itself. As before, to view the generated code, the user selects the property editor class in the Navigation pane and clicks the Source tab.

12. Adding Support for Serialization

Serializing a bean saves its state as a sequence of bytes that can be sent over a network or saved to a file. The BeansExpress wizard can add the support for serialization to one's class.

To add support for serialization, the user selects the bean in the Navigation pane and clicks the Bean tab to display the BeansExpress designers. Now, the user clicks the General tab to display the General page and checks a "Support Serialization" option. In response, the BeansExpress wizard modifies the class so that it implements the Serializable interface. In particular, two methods are added to the class: readObject( ) and writeObject( ).

```
void writeObject(ObjectOutputStream oos) throws IOException {
    oos.defaultWriteObject ( );
}
void readObject(ObjectInputStream ois) throws ClassNotFoundException,
IOException {
    ois.defaultReadObject ( );
    }
}
```

The user fills in these two methods to serialize and deserialize the bean.

13. Creating an Enterprise Java Bean

The system provides an Enterprise Java Bean Wizard for creating Enterprise Java Beans. An Enterprise Java Bean is a non-visual bean that runs on a server. Enterprise Java Beans are described in further detail in Sun's Enterprise Java Beans specification, located at http://java.sun.com/products/ejb/, the disclosure of which is hereby incorporated by reference.

Figure 11:
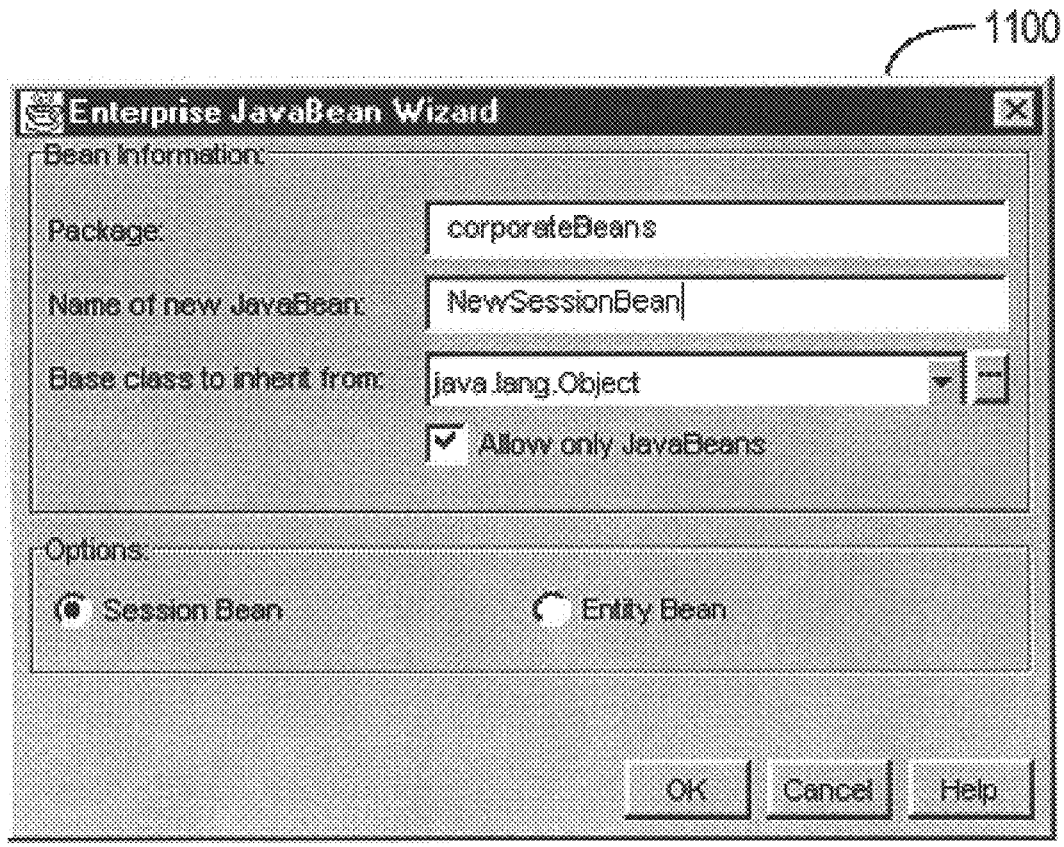
FIG. 11 is a bitmap screen shot illustrating an Enterprise JavaBean Wizard for assisting with creation of an Enterprise bean.

To begin creating an Enterprise Java Bean, the user chooses "File|New" and then selects an Enterprise Java Bean Wizard icon to display the Enterprise Java Bean Wizard 1100, as shown in FIG. 11. The user specifies the package the bean will be a part of, in the Package edit field. By default, the wizard uses the name of the current project. The user specifies a name for the Enterprise Java Bean in the Name of New Java Bean field. The user specifies the base class that the bean will extend in the Base Class to Inherit From field. If the user wants to ensure that any class selected is a Java Bean, he or she checks the Allow Only Java Beans option. Now, the user selects a Session Bean or Entity Bean and chooses OK.

The Enterprise Java Bean Wizard creates a class for the user that is a valid Java Bean. Within the class are several methods defined with empty bodies that the user will fill in. The following is sample code generated for a typical Session bean.

```
package Enterprise;
import java.rmi.*;
import javax.ejb.*;
public class NewSessionBean implements SessionBean {
    SessionContext context;
    public NewSessionBean( ) {
    }
    public void ejbCreate( ) throws RemoteException, CreateException {
    }
    public void ejbActivate( ) throws RemoteException {
    }
    public void ejbPassivate( ) throws RemoteException {
    }
    public void ejbRemove( ) throws RemoteException {
    }
    public void setSessionContext(SessionContext context) throws
RemoteException {
        this.context = context;
    }
}
```

INTERNAL OPERATION

A. Internal Architecture

Figure 12:
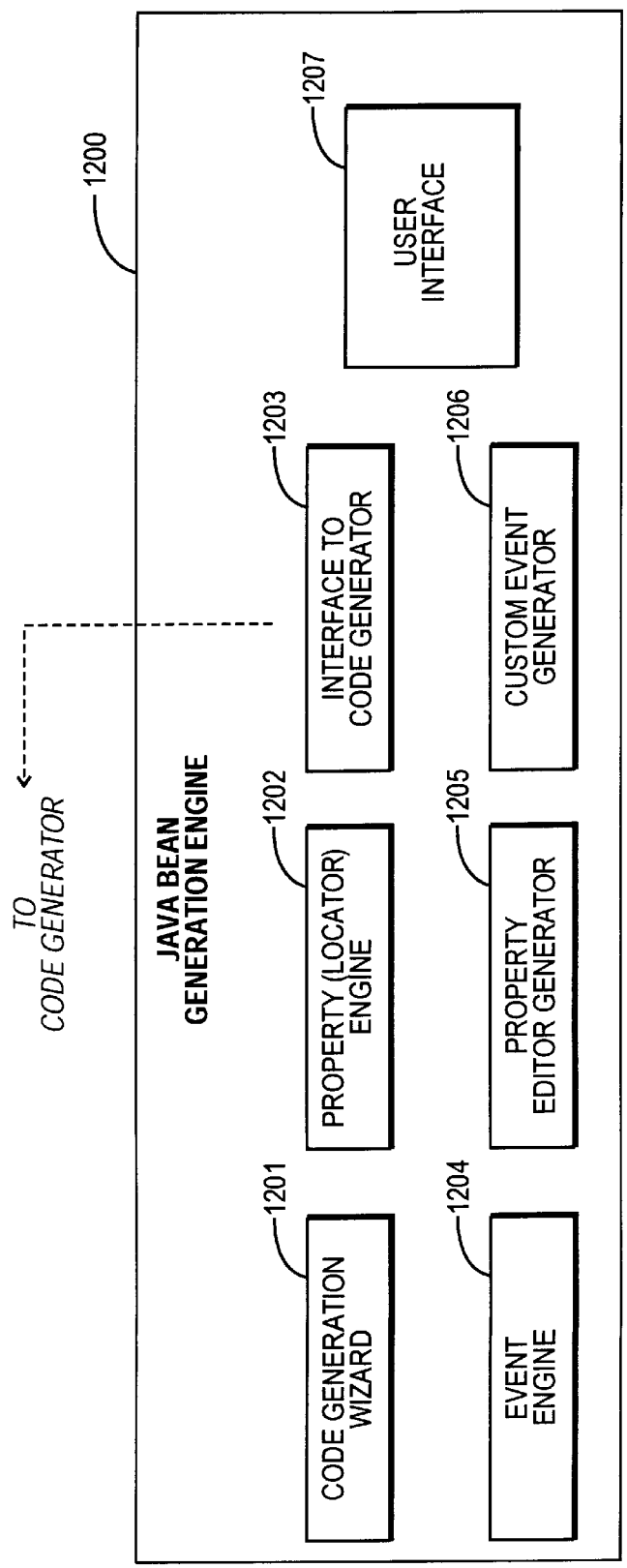
FIG. 12 is a block diagram illustrating a high-level view of a Java Bean generation (JBX) engine of the present invention.

Internally, the system provides a Java Bean generation (JBX) engine 1200, shown in FIG. 12, that includes a code generation wizard 1201, property (locator) engine 1202, interface to code generator or Java Object Toolkit ("Jot") 1203, event engine 1204, property editor generator 1205, custom event generator 1206, and user interface module 1207. In operation, the user decides he or she wants to create a new Java bean component. At this point, the user invokes the code generation wizard 1201. The code generation wizard 1201 gathers information about what type of bean is desired, such as an enterprise bean, and determines whether the bean includes special properties that must be treated specially. In response to this information, the wizard generates a basic framework for the component, according to internal rules.

From there, the user will often want to add new properties and, thus, will invoke the property engine (through the user interface). At this point (where the user wants to modify the component), the system invokes the interface to the code generator or Jot 1203. In particular at this juncture, the system needs to read the user's source code. The code generator itself provides functionality akin to the Java Introspector class, functioning to provide a list of properties, events, and methods which are in the bean. (Java Introspector class operates at the class level only, requiring a compiled class file.) The code generator parses the source code such that it can enumerate this information from source code. Therefore, at this point, the system has looked at the user's source code, for determining what (e.g., properties) it already contains. This information can now be presented to the user by the property (locator) engine 1202 by displaying a property sheet that lists all of the properties and their respective types, as well as corresponding attributes (e.g., bound or constrained) and other special data associated with them. Internally, the property engine 1202 fills out a property info structure and then displays a property sheet based on that structure.

Now, the system is operating in interactive mode, waiting for the user to add a new property, for instance. To add a new property, the user inputs sufficient information into a wizard (UI 1207) which allows the system to populate a new property info structure. Upon the user committing the change, the system generates a new property info structure internally and then writes out that change to source code. In particular, the user request is passed from the user interface 1207 back to the property engine 1202, which emits a new property info structure. This is communicated to the code generator, through the interface 1203. Based on the contents of this new structure, the code generator writes out new source code, accordingly.

In a similar manner, the system may receive a user request for the component to be a source for a new event. This request is sent to the event engine 1206. The engine, in turn, determines what type of event has been requested, as well as what are the names of the corresponding functions. Based on this determination, the engine then determines the appropriate source code which is required for implementing the event. This is communicated to the code generator, through the code generation interface 1203.

The custom event generator 1206 allows the user to create special events, ones which are not covered by standard events. Using the custom event editor, the user is allowed to define a custom event. The custom event generator, in response to user input at the custom event editor, generates appropriate new source code, in a manner similar to that described above for the event engine 1204.

Operation of the property editor generator 1204 is similar to that described above for other user interface actions. The specific input here is a request by the user to create a custom property editor. The user does this by inputting information in a user interface dialog. Depending on the choices which the user has selected, the property editor generator 1204 generates an appropriate property editor which the user can then use. In a manner similar to that described above, the system operates by taking the user request and generating appropriate source code, accordingly.

B. Internal Operation
1. Invocation

The BeansExpress Wizard is invoked by the user clicking on the Bean tab in the IDE (e.g., shown in FIG. 4). In other words, a user event occurring in the IDE triggers the process. When this occurs, the wizard is invoked with a project context. This includes information about the collection of files, class path, class loader location, and the like, for the current project under development. This allows the wizard to determine, for instance, where a reference that occurs in a file may be located. The wizard is also passed the underlying source file itself. in turn, the system parses the source file for determining what classes are in the file, including the class corresponding to the Java bean being created. The actual task of parsing the source file largely consists of filling out various context data structures, including JbxInfo, PropertyInfo, and EventInfo data structures. Since the Java bean must be a public class, and there is only one public class per file, it is straightforward to determine which class corresponds to the Java bean.

2. Core Classes and Data Structures

The JbxInfo data structure is a high-level data structure (implemented itself as a Java class) that contains information which is global to the bean's class. The data structure may be defined as follows (using the Java programming language).

member is a handle indicating the currently-selected node (from the IDE). JotPackages is a data member referencing a package manager. In effect, this serves as a combination of class loader and interface/handle to the code generator subsystem. The code generator subsystem provides interface routines, for instance, for determining where a particular method is located in the source code. The package manager may be replaced with any subsystem capable of parsing the structure of a Java file. The JbxMainPanel data member is a handle to the user interface (UI), allowing for the display of dialogs and other user interface elements.

Next, the JbxInfo data structure includes general information about the bean, for example, the name of the bean, its super-class, and its package. This is followed by private arrays. The first array, propertyInfo, contains an array of propertyInfo objects. One is declared for each property present in the bean under development. Similarly, superPropertyInfo holds property information from the super-class of the bean. This information is useful, for example, when adding a new property (and merging it into the bean). The superEvents array includes an array of events that are "sourced" in the super-class (i.e., the events that are fired by the super-class). The implementedinterfaces array includes information about which interfaces are implemented for the bean. This is useful for determining what things the bean is a listener for and for determining whether the bean is a special type of class.

The iconNames string array is a small array of icon names for the Java bean, which is useful for allowing the Java bean to represent itself in the designer. This is followed by several private boolean data members. The nativeChangeSupported member indicates whether the class has already implemented "property change" and "vetoable change," which

```
class JbxInfo // . . .
{
        private IdeEnvironment      ideEnvironment;
        private Project             project;
        private Node                node;
        private JotPackages         packageManager;
        private JbxMainpanel        jbxMainPanel;
        // . . .
        private String              beanName;
        private String              superName;
        private String              packageName;
        private Array               propertyInfo;
        private Array               superPropertyInfo;
        // . . .
        private Array               superEvents;
        private Array               implementedInterfaces;
        // . . .
        private String[ ]           iconNames = new String[ ] { " ", " ", " ", " "
};
        private boolean             nativeChangeSupported = false;
        private boolean             superPropertyChangeSupported = false;
        private boolean             superVetoableChangeSupported = false;
        private boolean             propertyChangeSupported = false;
        private boolean             vetoableChangeSupported = false;
        // . . .
        private boolean             enterpriseBean = false;
        private boolean             serializabie = false;
        // . . .
}
```

The IdeEnvironment data member is a handle to the IDE environment; it is useful for gaining information about the IDE, such as time stamps. Similarly, the Project data member is a handle to the current project and, therefore, can be used to gather information about the project. The Node data correspond to the common ways of notifying a listener that a property has changed. This information is recorded since it affects the code that is generated. The superPropertyChangeSupported boolean indicates whether "property change" is already supported in the super-class. Similarly, superVetoableChangeSupported whether "vetoable change" is already supported in the super-class. The propertyChangeSupported and vetoableChangeSupported members indicate whether "property change" and "vetoable change" are supported in one's own class (i.e., the current bean), respectively.

Finally, the enterpriseBean data member indicates whether the bean is an "enterprise" Java bean. An enterprise Java bean is one which follows additional considerations, such as residing on a server and being devoid of user interface. At this point, the system captures this information so that it may later correctly process the Java bean. The serializable data member indicates whether the bean can be streamed out—that is, whether it implements the Java I/O serialization specification.

The PropertyInfo data structure, which bears a resemblance to the Java property descriptor data structure (java.beans.PropertyDescriptor), is a structure that contains information about a given property. The data structure may be defined as follows.

```
class PropertyInfo
{
    boolean inherited;
    String name;
    String type;
    String readMethod;
    String writeMethod;
    boolean bound;
    boolean constrained;
    String displayName;
    String description;
    boolean exposed;
    String propertyEditorClass;
    // ...
    // Housekeeping methods for reading and writing this structure.
}
```

The inherited data member indicates whether the info has been built from a super-class or the current particular class. This is helpful in generating the code. This is followed by name and type of data members, which are strings storing self-evident information about the property. Similarly, the read method and write method strings store the names of the "getter" and "setter" methods, respectively. The next data member, bound, is a boolean data member indicating whether the property is bound. This means that the property fires "property change events" when it is changed. Another boolean, constrained, is a data member indicating whether the property is constrained, that is, whether it fires vetoable change events (when another is attempting to change the property).

The displayName and description are strings dealing with the bean info that is generated. The exposed member indicates whether in fact the property is exposed through bean info. If so, the display name and description provide information to the user about the exposed property (e.g., in a builder tool). Finally, the propertyEditorClass string indicates whether a special property editor exists for editing the class (as opposed to a default one).

The EventInfo data structure is a high-level data structure that contains information about a given event. The data structure may be defined as follows.

```
class EventInfo
{
    String eventSetName;        // e.g. Action
    String packageName;         // e.g. java.awt.event
    String objectName;          // e.g. ActionEvent
    String listenerName;        // e.g. ActionListener
    boolean currentSource;
    // True if the component currently fires this event
    boolean currentListener;
    // True if the component currently listens for this event.
    // ...
    // Housekeeping methods.
}
```

The eventSetName data member indicates the name of the corresponding event set. For example, a "mouse" event set might include: mouse clicked, mouse released, mouse pressed, and so forth and so on. Similarly, the packageName member includes the name of the corresponding package that must be imported for implementing the event. The objectName member stores the name of the corresponding event object. Every Java event method takes a corresponding event object, as one of its parameters. The event object contains information that is specific to the event. For example, the event object for an "action" event includes information about which object fired the event. Thus, the event object includes important context information about the event. The listenerName member indicates the name of the listener that one would need to implement to listen for the event. Finally, the data structure includes two boolean members, currentSource and currentListener. The former indicates whether the component currently fires the event (i.e., currently sources the event). The latter indicates whether the component currently listens for the event.

3. Internal Methods

The entry point for execution of the wizard is changeNode, a high-level method that may be implemented as follows.

```
// JbxContext class...
    public void changeNode(Node node) {
        if (this.node == node && showing)
            return;
        this.node = node;
        // Look for the JbxInfo in the hashmap.
        JbxInfo info = (JbxInfo) views.get(node);
        // If we couldn't find it, create a new one, and add it to the
        // hashmap.
        if (info == null) {
            info = new JbxInfo();
            // Build UI . . .
            JbxMainPanel jbxMainPanel = new JbxMainPanel(info);
            info.initializeData(project, node);
            jbxMainPanel.refresh(true);
            views.put(node, info);
        }
        else {
            info.initializeData(project, node);
            info.getMainPanel().refresh(true);
        }
        // show ui . . .
    }
```

As shown, the method is invoked with a Node object, which represents the current file in the user's project. At the outset, the method simply tests whether it is being invoked with a Node object that is already the current node. If so, then the method need not do any work and, hence, may simply return (to the caller). Each time the designer is invoked, the system employs a JbxInfo data structure (described above) for the node. For performance reasons, the method keeps JbxInfo data structures in a quick-access hash map. If a corresponding hash entry cannot be found for the current Node object, the method creates a new JbxInfo data structure. This is followed by initializing the UI, passing the JbxInfo data structure as a parameter. The actual task of initializing the info data structure is performed by invoking initializeData (described in further detail below). After the data structure has been initialized, it can be added to the hash table, and the system may proceed to show the UI.

The initializeData method itself may be implemented as follows.

```
// JbxInfo class. . .
    public void initializeData(Project project, Node node) {
        this.project = project;
        this.node = node;
        this.packageManager = project.getPackages ( );
        // Get JOT file handle. . .
        JotSourceFile srcFile = ((JavaSourceNode) node).getJotSourceFile( );
        // Housekeeping to keep us in sync. . .
```

```
        // ReadNode initializes the JbxInfo data structures.
        JbxEngine.readNode(this, project, node);
        // Build UI models to represent our data. . .
}
```

As shown, the method is invoked with the current Project and Node object. The method operates as follows. At the outset, the method saves off some of the parameter information into private structures. Now, the method gets the source file representation for the node. The source file is actually returned as a Jot file handle, which may be used to invoke various API. calls for determining information about the actual source file. The actual task of initializing the JbxInfo falls to a readNode method (described in further detail below), including initializing the propertyInfo and inventInfo data structures. After this call, the initializeData method may proceed to build UI models to represent the data.

The readNode method itself may be implemented as follows.

```
// JbxEngine. . .
    // This method reads the first class in the source file represented by
node
    // It stores the info into an Array of PropertyInfo objects, to be
    // retrieved later by JbxInfo.
    public static void readNode(JbxInfo jbxInfo, Project project, Node node)
{
        // Various edge case checking for IDE events. . .
        // . . .
        JotSourceFile srcFile = ((JavaSourceNode) node).getJotSourceFile( );
        JotClassSource jClassSource = ((JotClassSource)
(srcFile.getClasses( )) [0]);
        JotMethod[ ] jMethods = jClassSource.getDeclaredMethods ( );
        // Find superclass info. . .
        Class superClass = null;
        BeanInfo beanInfo = null;
        String superName = jClassSource.getSuperclass( ) .getName( );
        // Load the superclass itself to see if we can find it.
        //
        try {
            superClass = packageManager.loadClass(superName, false);
            System.err.println(" JBX DEBUG: Loaded the Superclass: " +
superName);
        }
        catch (ClassNotFoundException ex) {
            System.err.printin(" JBX DEBUG: Couldn't find the Superclass: " +
superName);
        }
        catch (NullPointerException ex) {
            System.err.printin(" JBX DEBUG: Couldn't find the Superclass: " +
superName);
        }
        // Get the actual beanInfo for the superclass, to use later.
        try {
            beanInfo = Introspector.getBeanInfo(superClass);
        }
        catch (IntrospectionException ex) {
            System.err.printin(" JBX DEBUG: Couldn't get BeanInfo for Superclass:
" + superName);
        }
        catch (NullPointerException ex) {
            System.err.println(" JBX DEBUG: Couldn't get BeanInfo for Superclass:
" + superName);
        }
        // Find stuff
        readProperties(jbxInfo, jMethods, beanInfo);
        readEvents(jbxInfo, jMethods, beanInfo);
        readInterfaces(jbxInfo, jClassSource, node);
```

```
        readSpecialInfo(jbxInfo, superClass);
jbxInfo.setBeanName(JotNames.getShortClassName(jClassSource.getName( )));
        jbxInfo.setPackageName(srcFile.getPackage( ));
        jbxInfo.setSuperName(jClassSource.getSuperclass( ).getName( ));
        jbxInfo.getPackageManager( ).release(srcFile);
}
```

This method, which is a workhorse routine, is invoked with the JbxInfo data structure to be filled out, together with the current project and node. It operates as follows. At the outset, it reads the first class in the source file; this is the class which is being designed (i.e., the bean). It stores the info into an array of PropertyInfo objects, to be retrieved later by JbxInfo. The method now invokes API calls, for determining specific information about the source file. The call to getJotSourceFile gets the source file representation. The call to getClasses returns the class source,jClassSource, which is the source for one particular class in the source file. This is the class of the bean which is being designed. The call to getDeclaredMethods returns jmethods, which is an array of methods that are implemented in the class. This includes, for instance, the name, type, and parameters for the methods.

Now, the readNode method proceeds to find the bean super-class information. The super-class itself is typically already compiled. Therefore, at this point, the method may load that super-class and invoke the Java Introspector (utility) to uncover the property descriptors that came from the super-class. Specifically, the method first loads the super-class and then the beanInfo for the super-class. The beanInfo is itself information allowing a class to describes itself to a builder tool. It includes, for example, information about properties and methods of the class, as well as events which the class listens for. To this end, beanInfo includes property descriptors, method descriptors, and event descriptors.

After getting the actual super-class and its beanInfo, the method proceeds to find out about properties, events, interfaces, and any special information for the class. This is done by invoking the Java readProperties, readEvents, readinterfaces, and readSpecialInfo API calls. The readProperties call finds out about properties in the super-class and in the bean itself In particular, this call, which fills out the two previously-mentioned property arrays (PropertyInfo and superPropertyInfo), may be implemented as follows.

```
        // Find out what properties are declared in the superclass, and what
properties
        // are declared in the bean itseif.
        private static void readProperties(JbxInfo jbxInfo, JotMethod[ ] jMethods,
BeanInfo beanInfo) {
        // First, fill the superPropertyInfo array with the properties that
exist
        // in the superclass.
        Array superPropertyInfo = new Array( );
        PropertyDescriptor[ ] pds = null;
        if (beanInfo != null) {
            try {
                pds = beanInfo.getPropertyDescriptors ( );
            }
            catch (Exception ex) {
                if (ex instanceof ClassNotFoundException) {
                    ex printStackTrace( );
                }
            }
        }
        if (pds != null) {
            for (int i = 0; i < pds.length; i++) {
                PropertyInfo propInfo = new PropertyInfo( );
                PropertyDescriptor pd = pds[i];
                if (pd == null) {
                    Systern.err.println(" JBX DEBUG: Skipping property: PropertyDescriptor is null");
                    continue;
                }
                else if (pd.getPropertyType( ) == null) {
                    System.err.println(" JBX DEBUG: Skipping property: " + pd.getName( ) + ", type is null (indexed property?)");
                    continue;
                }
                propInfo.inherited = true;
                propInfo.name = pd.getName( );
                propInfo.type = pd.getPropertyType( ).getName( );
                String packageName = JotNames.getPackageFromFullClassName(propInfo.type);
                if (packageName != null && packageName.equals("java.lang"))
                    propInfo.type = JotNames.getShortClassName(propInfo.type);
                propInfo.readMethod = pd.getReadMethod( ) != null ?
```

```
                pd.getReadMethod( ).getName( ) : null;
            propInfo.writeMethod = pd.getWriteMethod( ) != null ?
pd.getWriteMethod( ).getName( ) : null;
            propInfo.bound = pd.isBound( );
            propInfo.constrained = pd.isConstrained( );
            // Initialize beanInfo data
            propInfo.exposed = !pd.isHidden( );
            propInfo.displayName = pd.getDisplayName( );
            propInfo.description = pd.getshartDescription( );
            Class propEditor = pd.getPropertyEditorclass( );
            if (propEditor != null) {
//              System.err.println(" JBX DEBUG: propEditor" +
propEditor.getName( ));
//                  propInfo.propertyEditorClass = defaultEditorString;
                propInfo.propertyEditorClass = propEditor.getName( );
            }
            else
                propInfo.propertyEditorClass = defaultEditorString;
            superPropertyInfo.add(propInfo);
        }
    }
    // Now find the properties that we found in the source file we're
    // working with.
    Array declaredProps = getPropertyInfoArray(jMethods);
    jbxInfo.setSuperPropertyInfo(superPropertyInfo);
    jbxInfo.setPropertyInfo(declaredProps);
}
```

In operation, the readProperties method creates a propInfo structure for each property descriptor returned. The readProperties method sets up a loop that translates information from each property descriptor into a corresponding propInfo structure. After completion of the loop, a superPropertyInfo array has been created, which all of the propertyInfo data structures from the super-class have been added to.

By invoking getPropertyInfoArray, passing the array of methods from the source file, the readProperties method can determine the properties that are actually in the file that the system is currently working with. Internally, the system performs pattern matching, for determining whether something is a property. For example, from the Java specification, every property accessor must be public and non-static, since it must be able to be called from outside the package. From this approach, the method may infer the name of the corresponding property. In this manner, the method may apply a sequence of tests for determining whether a particular method is a property accessor method. If a property accessor method is located, say one called getAccountBalance, the method may infer that there is a property named accountBalance. Based on the signature for the accessor method, the system can determine the type of the property. In the case of getAccountBalance, for example, the accessor method (i.e., reader method) may return a type of integer (int). From this, the system may infer that there is a property, accountBalance, of type integer (int). The method may then later encounter the writer for the property, setAccountBalance. At the conclusion of the getPropertyInfoArray call, the system has constructed an array of PropertyInfo's—declaredProps—for the particular bean that is being designed. Now, the system may return to the caller, the readNode method.

The readNode method proceeds to read the events. This is done by invoking the readEvents call, which may be implemented as follows.

```
            // Find out what event sets are declared in the superclass, and what
event sets
            // are declared in the bean itself.
            private static void readEvents(JbxInfo jbxInfo, JotMethod[ ] jMethods,
BeanInfo beanInfo)
                // First, fill the superEventInfo array with the event sets that exist
                // in the superclass.
                Array superEventInfo = new Array( );
                EventsetDescriptor[ ] eds = null;
                if (beanInfo != null) {
                    try {
                        eds = beanInfo.getEventSetDescriptors( );
                    }
                    catch (Exception ex) {
                        if (ex instanceof ClassNotFoundException) {
                            ex.printStackTrace( );
                        }
                    }
                }
                if (eds != null) {
                    for (int i = 0; i < eds.length; i++) {
                        EventSetDescriptor ed = eds[i];
```

-continued

```
            String listenerFullName = ed.getListenerType( ).getName( );
            String packageName =
JotNames.getPackageFromFullClassName(listenerFullName);
            String listenerName = JotNames.getShortClassName(listenerFullName);
            EventInfo ei = new EventInfo(JbxEngine.capitalize(ed.getName( )),
                                        packageName,
                                        " ",
                                        listenerName);
            superEventInfo.add(ei);
        }
    }
    Array sourceEvents = new Array( );
    for (int i = 0; i < jMethods.length; i++) {
        // If the method is static or non-public, skip it. . .
        int mods = jMethods[i].getModifiers( );
        if (Modifier.isStatic(mods) || !Modifier.isPublic(mods)) {
            continue;
        }
        String type = jMethods[i].getReturnType( ).getName( );
        // If we can't find the type, or the type isn't void, skip it. . .
        if (type == null || !type.equals("void"))
            continue;
        EventInfo ei = makeEventInfo(jbxInfo, jMethods[i]);
        if (ei != null && !sourceEvents.contains(ei)) {
            ei.currentSource = true;
            sourceEvents.add(ei);
        }
    }
    jbxInfo.setSuperEvents(superEventInfo);
    jbxInfo.setSourceEvents(sourceEvents);
}
```

Operation of the readEvents method is very similar to that described for the readProperties method. Specifically, it reads in the events that are declared in the super-class and the events that are declared in the bean itself. Again, beanInfo is employed to find all the events. Once that information is found, the readEvents method builds an eventInfo object for each event descriptor found (from the Java beanInfo object). After the method determines all the ones declared in the super-class, it proceeds to enumerate all the ones declared in the file (bean) itself. Just as the properties have identifiable design patterns, so do the event sets. Suppose, for instance, that the bean is going to be a source for an action event. In such a case, it will need a method called addActionListener and a method called removeActionListener (here, the methods providing a way for other components to add or remove themselves as listeners). This pattern may be used to identify the events in the bean. Specifically, the method may process the array of methods obtained from Jot (i.e., code generator), applying a pattern matching test (e.g., begins with an "add" or "remove" and ends with "listener"). After completing the readEvents processing, the system returns to the caller, readNode.

The call to readEvents found all the events that were sourced. The approach for finding events that the bean is listening for is, however, different. To listen for an event, the bean must implement the particular event listener interface. To perform this work, the readNode method invokes readinterfaces, which may be implemented as follows.

```
        private static void readInterfaces(JbxInfo jbxInfo, JotClassSource
jClassSource, Node node) {
            Array listenerEvents = new Array( );
            Array implementedInterfaces = new Array( );
            JotType[ ] jtype = jClassSource.getInterfaces ( );
            if (jtype != null) {
                for (int i = 0; i < jtype.length; i++) {
                    String iName = getFullType(jbxInfo, node, jtype[i].getName( ));
                    implementedInterfaces.add(iName);
                    if (iName.endsWith("Listener")) {
                        String packageName = JotNames.getPackageFromFullClassName(iName);
                        String listenerName = JotNames.getShortClassName(iName);
                        int index = listenerName.lastIndexOf("Listener");
                        EventInfo ei = new EventInfo(listenerName.substring(0, index),
                                        packageName,
                                        " ",
                                        listenerName);
                        if (ei != null && !listenerEvents.contains(ei)) {
                            ei.currentListener = true;
                            listenerEvents.add(ei);
                        }
                    }
                }
            }
```

-continued

```
        }
    }
    else
        System.err.println(" JBX DEBUG: jtype == null");
    jbxInfo.setImplementedInterfaces(implementedInterfaces);
    jbxInfo.setListenerEvents(listenerEvents);
}
```

In a manner similar to that described above, the readInterfaces method applies a sequence of pattern-matching tests. Thus, the method can determine any interfaces that actually listen for events. After completing the processing, the system returns again to the caller, readNode.

The readSpecialInfo method may now be invoked for reading any special information. There are common ways to fire property-change events and property-vetoable events. These are so common that many base classes implement them. The readSpecialInfo method determines whether the base classes specifically support that. This affects the code which the system generates. After completing this processing, the system returns again to the caller, readNode.

The readNode method concludes by setting the name of the bean, setting the package name, and setting the super-class name. At that point, the system has initialized all the members in the JbxInfo object or structure, including all the propertyInfo structures and EventInfo structures. By properly parsing the source code for uncovering this information, the call to the readNode method allows the system to be a two-way tool.

Now, the UI is initialized with the two-way tools information. Accordingly, the user can use the two-way functionality of the system, such as adding a method, adding an event, or adding a property. If the user, for instance, wants to add a property, the system already knows exactly what properties are present in the bean—this information is maintained in the current JbxInfo for the bean. Upon the user completing a New Property user interface dialog for adding a property, the JbxInfo class's addProperty method is invoked.

```
// JbxInfo worker function example...
    // Methods called by the NewPropertyDialog...
    public void addProperty(PropertyInfo pi, boolean override) {
        // Housekeeping...
        // Call PropertyEngine...
    }
```

The method is invoked with a propertyInfo object, which was built from the information entered by the user into the New Property dialog. Specifically, the propertyInfo object is set with the particular information entered by the user, including the name and type for the new property.

Based on its knowledge of existing properties in the bean and the super-class, the system may now generate appropriate source code for adding the new property. For adding a property, the system invokes the Property Engine, which itself has an addProperty method.

```
// PropertyEngine worker function example. . .
        static void addProperty(JbxInfo jbxInfo, Node node, PropertyInfo pi,
boolean override)
            String propertyName    = pi.name;
            String type            = pi.type;
            boolean reader         = pi.readMethod != null;
            booiean writer         = pi.writeMethod != null;
            JotSourceFile srcFile =
jbxInfo.getPackageManager( ).getSourceFile(((JavaSourceNode)
node).getFilename( ));
            JotClassSource jClassSource = ((JotClassSource)
(srcFile.getclasses( ))[0]);
            JotMethod[ ] jMethods = jClassSource.getDeclaredMethods( );
            JotField[ ] jFields = jClassSource.getDeclaredFields( );
            JotMarker methodLocation = jMethods.length > 0 ? ((JotMarker)
jMethods[jMethods.length-1]) : null;
            JotMarker fieldLocation = jFields.length >0 ? ((JotMarker)
jFields[jFields.length-1]) : null;
            String propertySuffix = capitalize(propertyName);
            if (!override) {
                // If the field name already exists with a different type, all bets
are
                // off, so do nothing.
                JotFieldDeclaration fieldDec = jClassSource.addField(fieldLocation,
false, type, propertyName);
                if (!Validator.isFieldConflict(fieldDec, jFields)
                    // Determine whether or not to generate the field.
                    if (!Validator.isAlreadyDeclared(fieldDec, jFields))
                        fieldDec.setModifiers(Modifier.PRIVATE);
                    }
                    else
                        jClassSource.removeField(fieldDec);
                }
```

```
        }
        // Should we generate a reader for this property?
        if (reader)
                addReader (jbxInfo, jClassSource, jMethods, pi, override);
        // Should we generate a writer for this property?
        if (writer)
                addWriter(jbxInfo, jClassSource, jMethods, pi, override);
        if ((pi.bound || pi.constrained) && !jbxInfo.isNativeChangeSupported( ))
{
                EventEngine.addPropertyChangeSupport(jbxInfo, srcFile, jClassSource);
                if(pi.constrained)
                        EventEngine.addVetoableChangeSupport(jbxInfo, srcFile,
jClassSource);
                }
                jbxInfo.updateTimestamp(srcFile, true);
        }
```

The Property Engine has additional lower-level context for supporting actual generation of code. For example, if the code is overridden, the engine knows that it need not generate a storage variable, because the super-class already has one. Similarly, for a bound property or constrained property, the code that is generated is somewhat different. For example, for a constrained property, the generated code must first fire a vetoable-change event before setting the property. In a complementary fashion, the generated coded must subsequently fire a property-change event after setting the property.

The addProperty method includes calls to helper or worker functions, addReader and addWriter. The addWriter and addReader methods are the actual methods which add a writer and add a reader, respectively. For example, an exemplary addWriter helper function may be implemented as follows.

```
        // Add a property setter to this class
        //
        private static void addWriter(JbxInfo jbxInfo, JotClassSource
jClassSource, JotMethod[ ] jMethods, PropertyInfo pi, boolean override) {
                JotMarker methodLocation = jMethods.length > 0 ? ((JotMarker)
jMethods[jMethods.iength-1]) : null;
                String writerName = makeWriterName(pi.name);
                String propertySuffix = capitalize(pi.name);
                JotMethodSource setSource = jClassSource.addMethod(methodLocation,
false, "void", writerName); //NORES
                setSource.setParameterText(pi.type + " new" + propertySuffix);
                setSource.setModifiers(Modifier.PUBLIC);
                if (!pi.bound && !pi.constrained) {
                        // Define the set<property> method. We want it to look like this. . .
                        //
                        // public void setSample(<type>newSample)
                        //    sample = newSample;
                        // }
                        //
                        // . . . or this . . .
                        //
                        // public void setSample(<type>newsample) {
                        //    super.setSample(newSampie);
                        // }
                        if (override)
                                setSource.getCodeBlock( ).addStatement(null, false, "super." +
writerName + "(new" + propertySuffix +")");
                        else
                                setSource.getCodeBlock( ).addStatement(null, false, pi.name + " =
new" + propertySuffix);
                }
                else if (pi.bound || pi.constrained) {
                        // Define the set<property>method. We want it to look like
something like this . . .
                        //
                        // public void setSample(<type>newSample) throws
java.beans.PropertyVetoException {
                        //    <type>oldSample = sample;
                        // fireVetoableChange("sample", oldSample, newSample);
                        // sample = newSample;
                        // firePropertyChange("sample", oldSample, newSample);
                        // }
                        //
                        // Declare the storage variable for the aid value. We want it to
```

-continued

```
look like this.
//
        // <type>oldSample = sample;
        //
        // . . .or like this. . .
        //
        // <type> oldSample = super.getSample( );
        //
        String typeObject = getClassFromPrimitive(pi.type);
        String oldObject = typeObject == null ? "old" + propertySuffix
                                              : "new" +
getClassFromPrimitive(pi.type) + "(old" + propertySuffix + ")";
        String newObject = typeObject == null ? "new" + propertySuffix
                                              : "new " +
getClassFromPrimitive(pi.type) + "(new" + propertySuffix + ")";
        JotVariableDeclaration jVarDec =
setSource.getCodeBlock( ).addVariableDeclaration(null, false, pi.type, "
old" + propertySuffix);
        if (!override)
            jVarDec.setInitializer(pi.name);
        else
            jVarDec.setInitializer(makeReaderName(pi.name, pi.type) + "( )");
        if (pi.constrained) {
            // Fire the PropertyChangeEvent to our vetoable listeners. Like
so . . .
            //
            // fireVetoableChange("sample", oldSample, newSample);
            //
            // . . . or like . . .
            //
            // vetoableChangeListeners.fireVetoableChange("sample", oldSample,
newSample);
            //
            setSource.addThrowSpecifier(null, false,
"java.beans.PropertyVetoException");
            String callString = jbxInfo.isNativeChangeSupported( ) ?
"fireVetoableChange"
                                              :
vetoableMulticaster + ".fireVetoableChange";
            JotMethodCall vetoMethod =
setSource.getCodeBlock( ).addMethodCall(null, false, callString, null);
            vetoMethod.addArgument(null, false, "\"" + pi.name + "\"");
            vetoMethod.addArgument(null, false, oldobject);
            vetoMethod.addArgument(null, false, newobject);
        }
        // Assign the new value like this . . .
        //
        // sample = newSample;
        //
        // . . . or like this . . .
        //
        // super.setSample(newSample);
        //
        if (!override)
                setSource.getCodeBlock( ).addStatement(null, false, pi.name + " =
    new" + propertySuffix);
                else
                setSource.getCodeBlock( ).addStatement(null, false, "super."+
writerName + "(new" + propertySuffix + ")");
        if (pi.bound) {
            // Fire the PropertyChangeEvent to our property change iisteners.
Like . . .
            //
            // firePropertyChange("sample", oldSample, newSample);
            //
            // . . . or like . . .
            //
            // propertyChangeListeners.firePropertyChange("sample", oldSample,
newSample);
            //
            String callString = jbxInfo.isNativeChangeSupported( ) ?
"firePropertyChange"
                                              :
propertyMuiticaster + ".firePropertyChange";
            JotMethodCall changeMethod =
setsource.getCodeBlock( ).addMethodCall(null, false, callString, null);
            changeMethod.addArgument(null, false, "\""+ pi.name + "\"");
            changeMethod.addArgument(null, false, oldObject);
            changeMethod.addArgument(null, faise, newObject);
```

```
        }
    }
    if (Validatar.isAlreadyDeclared(setSource, jMethods))
        jClassSource.removeMethod(setSource);
}
```

The addWriter method may be invoked in multiple places, for instance, when the user has added a property that has a writer or modified a property to add a writer. At the outset, the addWriter method determines, based on the name of the property, what the name of the writer should be. For example, if the property name is accountBalance then the writer should be named setAccountBalance. The actual code that is generated depends on whether the property is overridden, bound, or constrained, as specified in the corresponding propertyInfo structure. If the property is not overridden, for instance, the system has already generated a storage variable for it and may simply proceed to assign into that storage variable. Otherwise, the code must be generated somewhat differently. In such a case, the value of the property is maintained in the super-class and must be updated there by calling the appropriate setter method. As another example, in the case of a constrained property, code must be added to temporarily save the old value (of the property) and invoke a vetoable change, passing the old and new values (that may trigger an exception that prevents the property from being changed).

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a system for developing computer programs, said programs being created, at least in part, from software components, a method for assisting a user with creation of components, the method comprising:
   providing design patterns specifying how components created in the system must appear when in source code form;
   receiving user input for creating a particular component of interest, said user input specifying at least one property to be created for the component, including specifying whether said at least one property should have associated functions for setting and getting values for the property;
   based on said design pattern and said user input, emitting source code suitable for creating the particular component, said source code including functions for setting and getting values for at least one property;
   receiving a request to add a new property to the particular component;
   in response to said request and in response to parsing said emitted source code, displaying a user interface dialog allowing the user to specify a name and type for the new property for the already-created particular component; and
   based on said name and type for the new property, emitting new source code suitable for creating the particular component, said new source code including source code for creating the new property for the particular component.

2. The method of claim 1, wherein said user input includes a user-specified name for the particular component.

3. The method of claim 2, wherein the associated function for setting values for a property comprises a function that takes a parameter having a data type that is the same as that for the property.

4. The method of claim 2, wherein the associated function for getting values for a property comprises a function that returns a value having a data type that is the same as that for the property.

5. The method of claim 2, wherein the associated functions for getting and setting values each include a function name that is based, at least in part, on the user-supplied name for the particular component.

6. The method of claim 1, wherein said particular component is a Java bean component and wherein said step of emitting source code includes:
   emitting a Java class suitable for creating the Java bean component.

7. The method of claim 1, wherein said design patterns specify how properties, methods, and events should appear in source code form for components.

8. The method of claim 1, wherein said design patterns specify how components should be packaged for re-use in the system.

9. The method of claim 1, wherein said receiving step includes:
   receiving user input indicating whether the particular component should register to listen for events occurring at another component.

10. The method of claim 9, wherein said step of emitting source code includes:
    emitting source code for indicating that the particular component should register to listen for events occurring at another component.

11. The method of claim 1, wherein each component comprises a collection of one or more Java classes that serves as a self-contained, reusable component.

12. The method of claim 1, wherein said receiving step includes:
    receiving user input indicating that the particular component should include user-specified methods.

13. The method of claim 12, wherein said step of emitting source code includes:
    emitting at least initial source code for user-specified methods that the user has indicated that the particular component should include.

14. The method of claim 1, wherein said source code comprises Java-compatible source code.

15. The method of claim 1, wherein said particular component is a Java bean component and wherein said step of receiving user input includes:
    displaying a user interface dialog allowing the user to specify a name for the component, a package that the component will be in, and a class that the component will extend from.

16. The method of claim 1, wherein said particular component is a Java bean component and wherein said step of emitting source code includes:
    emitting a Java class suitable for creating the Java bean component, wherein said Java class is declared as public and includes a parameterless constructor.

17. The method of claim 1, wherein a property's associated function for getting values for the property returns the current value of the property, and wherein a property's function for setting values for the property sets the property to a new value.

18. The method of claim 1, further comprising:

allowing the user to specify whether the new property should have associated functions for setting and getting values for the property.

19. In a system for developing computer programs, said programs being created, at least in part, from software components, a method for assisting a user with development of components, the method comprising:

providing design patterns specifying how components created in the system must appear when in source code form;

based on said design patterns, creating a particular component by emitting source code for the particular component;

after creation of the particular component, receiving first user input requesting modification of the particular component of interest;

in response to said first user input, determining from said design patterns and from parsing the emitted source code for the particular component at least one property of the particular component that is suitable for modification;

displaying a user interface dialog displaying properties of the particular component suitable for modification;

receiving second user input specifying modification of a particular property of the particular component; and in response to said second user input, emitting new source code suitable for recreating the particular component with the user-specified modification of the particular property.

20. The method of claim 19, wherein said first user input includes a user-specified selection of the particular component from a list of components.

21. The method of claim 20, wherein the determining step includes:

parsing the source code for identifying properties of the particular component.

22. The method of claim 19, wherein the source code comprises Java source code.

23. The method of claim 19, wherein said particular component is a Java bean component and wherein said step of emitting source code includes:

emitting a new Java class suitable for modifying the Java bean component.

24. The method of claim 19, further comprising:

compiling the emitted source code for recreating the particular component.

25. The method of claim 19, wherein said design patterns specify how properties, methods, and events should appear in source code form for components.

26. The method of claim 19, wherein said design patterns specify how components should be packaged for re-use in the system.

27. The method of claim 19, wherein the modification specified by said second user input comprises modifying an existing property's type.

28. The method of claim 19, wherein the modification specified by said second user input comprises deletion of an existing property.

29. A development system for assisting a user with development of components used to create software programs, the system comprising:

a parser for parsing source code for a component of interest which has already been previously generated in source code form, for determining from the source code properties, events, and methods of the component;

a user interface for displaying information relating to said parsing of the source code and for receiving user input for changing selected ones of the properties, methods, and events of the component of interest; and a code generator for emitting new source code for the particular component, said new source code including any changes specified for the component by the user.

30. The system of claim 29, wherein said parser includes design patterns for identifying properties, events, and methods of the component.

31. The system of claim 29, wherein said component comprises a Java bean component and wherein said source code comprises Java source code.

32. The system of claim 29, wherein said user input for changing selected ones of the properties, methods, and events comprises user input for adding, removing, or modifying selected ones of the properties, methods, and events.

33. The system of claim 29, further comprising:

a code editor allowing the user to edit source code for the component of interest, wherein said parser is still capable of parsing source code that has been edited by the user, for determining properties, events, and methods of the component.

34. In a system for developing computer programs, said programs being created, at least in part, from software components, a method for assisting a user with development of components, the method comprising:

providing design patterns allowing the system to determine from source code any properties, methods, and events for a given component;

based on said design patterns, creating a particular component of interest;

receiving first user input requesting a change to the particular component of interest;

in response to said first user input, determining from said design pattern and from source code for the particular component the properties, methods, and events of the particular component;

displaying a user interface dialog displaying information about at least one of any properties, methods, and events of the particular component;

receiving second user input specifying change of a particular properties, methods, or events of the particular component; and in response to said second user input, emitting source code suitable for recreating the particular component with the user-specified change of the component.

35. The method of claim 34, wherein said first user input includes a user-specified selection of the particular component from a list of components.

36. The method of claim 34, wherein the determining step includes:

parsing the source code for identifying at least some of the properties, methods, and events of the particular component.

37. The method of claim 34, wherein the source code comprises Java source code.

38. The method of claim 34, wherein said particular component is a Java bean component and wherein said step of emitting source code includes:

emitting a new Java class suitable for changing the Java bean component.

\* \* \* \* \*